(12) United States Patent
Gauger

(10) Patent No.: US 7,904,322 B2
(45) Date of Patent: Mar. 8, 2011

(54) NETWORK BASED, INTERACTIVE PROJECT MANAGEMENT APPARATUS AND METHOD

(76) Inventor: Derek K. Gauger, Ann Arbor, MI (US)

( * ) Notice: Subject to any disclaimer, the term of this patent is extended or adjusted under 35 U.S.C. 154(b) by 48 days.

(21) Appl. No.: 11/697,319

(22) Filed: Apr. 6, 2007

(65) Prior Publication Data

US 2007/0288292 A1 Dec. 13, 2007

Related U.S. Application Data

(62) Division of application No. 10/039,999, filed on Oct. 24, 2001.

(60) Provisional application No. 60/242,853, filed on Oct. 24, 2000.

(51) Int. Cl.
*G06F 9/44* (2006.01)

(52) U.S. Cl. .......................................................... 705/7

(58) Field of Classification Search ..................... 705/10
See application file for complete search history.

(56) References Cited

U.S. PATENT DOCUMENTS

| | | | | | |
|---|---|---|---|---|---|
| 5,077,694 | A | * | 12/1991 | Sansone et al. | 705/406 |
| 5,208,765 | A | * | 5/1993 | Turnbull | 702/84 |
| 5,548,506 | A | * | 8/1996 | Srinivasan | 705/8 |
| 5,696,965 | A | * | 12/1997 | Dedrick | 707/10 |
| 5,765,140 | A | * | 6/1998 | Knudson et al. | 705/9 |
| 5,826,252 | A | * | 10/1998 | Wolters et al. | 717/101 |
| 5,848,248 | A | * | 12/1998 | Kawasaki et al. | 709/238 |
| 6,058,395 | A | * | 5/2000 | Buzaglo et al. | 1/1 |
| 6,101,481 | A | * | 8/2000 | Miller | 705/9 |
| 6,161,113 | A | * | 12/2000 | Mora et al. | 715/234 |
| 6,192,050 | B1 | | 2/2001 | Stovall | |
| 6,212,549 | B1 | * | 4/2001 | Page et al. | 709/205 |
| 6,230,156 | B1 | * | 5/2001 | Hussey | 707/10 |
| 6,282,514 | B1 | * | 8/2001 | Kumashiro | 705/7 |
| 6,295,513 | B1 | * | 9/2001 | Thackston | 703/1 |
| 6,308,163 | B1 | * | 10/2001 | Du et al. | 705/8 |
| 6,341,290 | B1 | | 1/2002 | Lombardo et al. | |
| 6,370,562 | B2 | * | 4/2002 | Page et al. | 709/204 |
| 6,370,567 | B1 | * | 4/2002 | Ouchi | 709/206 |
| 6,370,575 | B1 | * | 4/2002 | Dougherty et al. | 709/224 |
| 6,381,610 | B1 | * | 4/2002 | Gundewar et al. | 1/1 |

(Continued)

OTHER PUBLICATIONS

Morrison D, Buckley M and Cappo S. Building a Portal with Lotus Domino. IBM. Oct. 1999. 1-97.*

(Continued)

*Primary Examiner* — Romain Jeanty
*Assistant Examiner* — Brett Feeney
(74) *Attorney, Agent, or Firm* — Young Basile

(57) ABSTRACT

An apparatus and method utilizing a network based interactive computer system for project management. Information modules are provided and accessible by authorized project team members to assign tasks, prepare documents, request collaboration for information and issue resolution. Smart electronic mail notifications are provided to enable quick response to notifications with the ability to attach documents. Each user can establish a personal portal defining the manner and which notifications relating to the project which each user will receive.

13 Claims, 22 Drawing Sheets

U.S. PATENT DOCUMENTS

| | | | |
|---|---|---|---|
| 6,507,845 B1 * | 1/2003 | Cohen et al. | 707/608 |
| 6,571,158 B2 * | 5/2003 | Sinex | 701/29 |
| 6,591,300 B1 | 7/2003 | Yurkovic | |
| 6,606,623 B1 | 8/2003 | Hsieh et al. | |
| 6,640,145 B2 | 10/2003 | Hoffberg et al. | |
| 6,684,212 B1 | 1/2004 | Day et al. | |
| 6,741,265 B2 | 5/2004 | Ghosh et al. | |
| 6,766,205 B1 | 7/2004 | Williams et al. | |
| 6,809,749 B1 | 10/2004 | Chen et al. | |
| 6,820,071 B1 * | 11/2004 | Sullivan | 706/50 |
| 6,920,495 B1 * | 7/2005 | Fuselier et al. | 709/224 |
| 6,968,343 B2 * | 11/2005 | Charisius et al. | 1/1 |
| 7,072,940 B1 * | 7/2006 | Day et al. | 709/204 |
| 7,213,030 B1 * | 5/2007 | Jenkins | 707/104.1 |
| 2002/0035450 A1 * | 3/2002 | Thackston | 703/1 |
| 2002/0065701 A1 * | 5/2002 | Kim et al. | 705/9 |
| 2004/0064351 A1 | 4/2004 | Mikurek | |
| 2004/0073448 A1 | 4/2004 | Barts et al. | |
| 2004/0075677 A1 | 4/2004 | Loyall et al. | |

OTHER PUBLICATIONS

Manuel Castells, "Toward a Sociology of Network Society," Sep. 2000, Contemporary Sociology, University of California, Berkley, p. 693.

Office action dated Feb. 4, 2005 for U.S. Appl. No. 10/039,999.
Office action dated Oct. 20, 2005 for U.S. Appl. No. 10/039,999.
Office action dated Dec. 27, 2007 for U.S. Appl. No. 10/039,999.
Office action May 4, 2007 for U.S. Appl. No. 10/039,999.
Co-pending U.S. Appl. No. 11/697,345, filed Apr. 6, 2007, a Division of U.S. Appl. No. 10/039,999.
Co-pending U.S. Appl. No. 11/697,365, filed Apr. 6, 2007, a Division of U.S. Appl. No. 10/039,999.
Co-pending U.S. Appl. No. 10/039,999, filed Oct. 24, 2001.
Office action Dec. 28, 2007 for U.S. Appl. No. 10/039,999.
Office Action dated May 13, 2008 for U.S. Appl. No. 10/039,999.
Office Action dated Dec. 1, 2008 for U.S. Appl. No. 10/039,999.

* cited by examiner

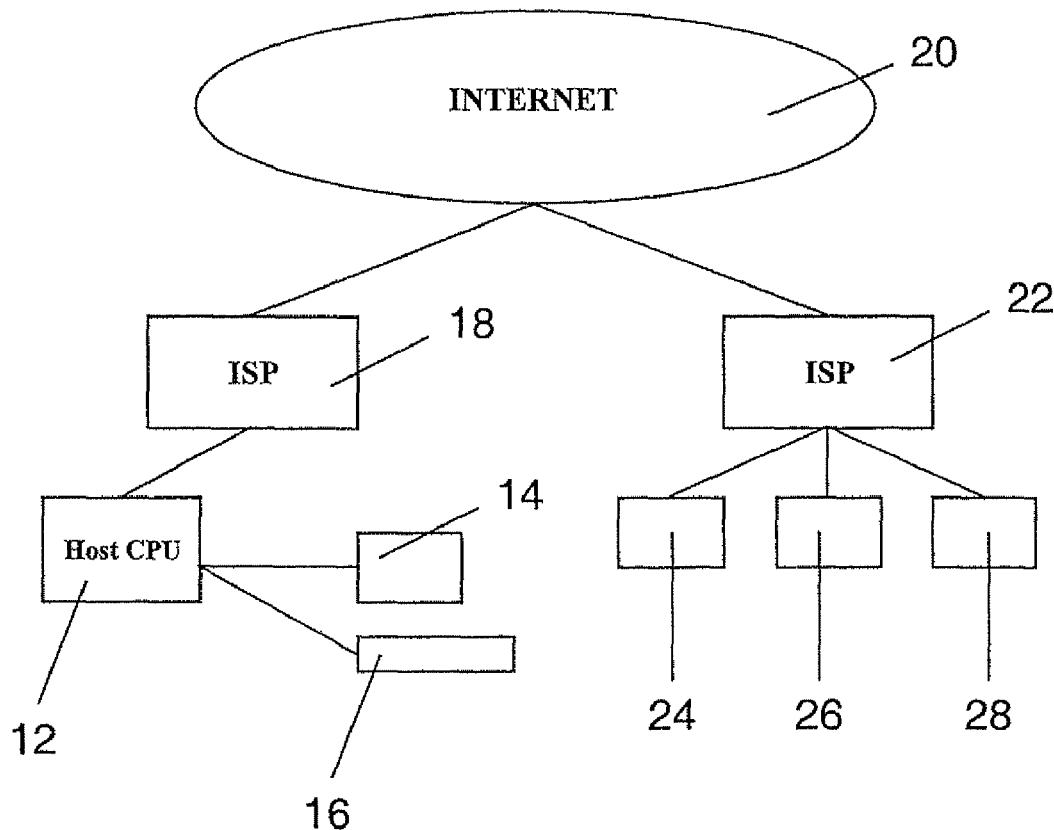
FIG - 1
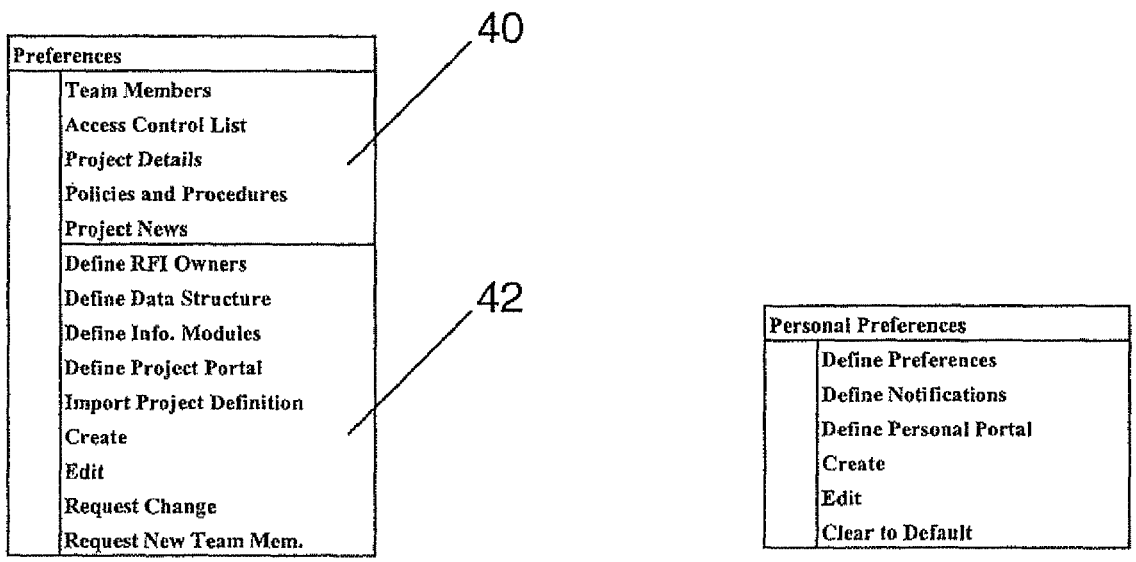
FIG - 3                    FIG - 4

| Home | Refresh | Back | ∨ | Forward | Search | | RFI | Create | Subscribe |
|---|---|---|---|---|---|---|---|---|---|
| Team | Sort | | Printable Version | 1 year | ∨ | Undo | Bookmark | Edit | Unsubscribe |
| Calendar | Split Scr. | | 10242 Seat Mechanism Proj. | | ∨ | Logoff | Sync | Notepad | Notify |

32 (top group):
- Project Preferences
- Personal Preferences
- Project Plan
- Document Manager
- Task Manager

34:
- Tasks List
- Tasks Reports
- Task Detail
- Closed Tasks
- Archived Tasks
- Create
- Edit
- Close
- Notify
- Archive
- Delete

32 (bottom group):
- Issue Manager
- Meeting Center
- Collaboration Center
- RFI Manager
- Review Manager
- Change Manager
- Report Center
- Finance Center

| | Task Name | Owner | Start ∨ | Due | Comp | D | I |
|---|---|---|---|---|---|---|---|
| X | Finalize Customer Contracts | Bill Jones | 15-May | 22-May | 70% | | |
| | Pricing Agreements | Bill Jones | 15-May | 17-May | 100% | | |
| | Schedule Agreements | Joe Adams | 17-May | 17-May | 100% | | |
| | QA Requirements | Tom Smith | 18-May | 22-May | 50% | | |
| | Complete Phase I Drawings | Karen Johnson | 20-May | 17-Jun | 10% | | |
| | Component Parts | Kirk Wood | 20-May | 30-May | 25% | | |
| | Sub-Assemblies | Corey Nast | 29-May | 15-Jun | 10% | | |
| | Final Assembly | Kirk Wood | 7-Jun | 15-Jun | 5% | | |
| | Bill of Material | Karen Johnson | 15-Jun | 17-Jun | 0% | | |
| X | Investigate linkage field failure | Karen Johnson | 22-May | 10-Jun | 25% | | |
| | Root cause analysis | Karen Johnson | 22-May | 7-Jun | 90% | | |
| | Corrective action plan | Karen Johnson | 5-Jun | 10-Jun | 0% | | |
| | Create Phase I Testing Plan | Tom Smith | 23-May | 15-Jun | 0% | | |
| | Draft Plan | Jeff Miner | 23-May | 5-Jun | 0% | | |
| | Engineering Approval | Karen Johnson | 3-Jun | 8-Jun | 0% | | |
| | Manufacturing Approval | Andrew Sage | 5-Jun | 10-Jun | 0% | | |
| | Customer Approval | Bill Jones | 8-Jun | 15-Jun | 0% | | |
| | Procure Phase I Prototypes | Laurie Snyder | 10-Jun | 25-Jul | 0% | | |
| | Component Parts | Laurie Snyder | 10-Jun | 14-Jul | 0% | | |
| | Purchased | Laurie Snyder | 10-Jun | 12-Jul | 0% | | |
| | Manufactured | Andrew Sage | 10-Jun | 14-Jul | 0% | | |
| | Assembly Fixtures | Tom Sayer | 13-Jun | 10-Jul | 0% | | |
| | Check Fixtures | Tom Sayer | 25-Jun | 25-Jul | 0% | | |

FIG - 6

| Project Plan |
|---|
| Overview |
| Specs. / Requirements |
| Timing Plan |
| Tasks List |
| Budget |
| Calendar |
| Create |
| Edit |
| Notify |
| Archive |
| Delete |

FIG - 9

| Document Manger |
|---|
| Create/Upload |
| Upload Multiple Files |
| Edit |
| View |
| Download |
| Request Change |
| Request Review |
| Notify |
| Archive |
| Delete |

Notifications

| | | Owned By: | Created By: |
|---|---|---|---|
| Documents | ☐ Uploaded<br>☐ Changed<br>☐ Downloaded | ☐ ◁▷ ☐ | ☐ ◁▷ ☐ |
| Tasks | ☐ Created<br>☐ Status Change<br>☐ Completed<br>☐ Late<br>☐ To be Completed in | ☐ ◁▷ ☐<br><br><br><br>[    ] | ☐ ◁▷ ☐ |
| Issues | ☐ Created<br>☐ Status Change<br>☐ Completed<br>☐ Late<br>☐ To be Completed in | ☐ ◁▷ ☐<br><br><br><br>[    ] | ☐ ◁▷ ☐ |
| Chg. Req. | ☐ Created<br>☐ Status Change<br>☐ Completed<br>☐ Late<br>☐ To be Completed in | ☐ ◁▷ ☐<br><br><br><br>[    ] | ☐ ◁▷ ☐ |
| Rev. Req. | ☐ Created<br>☐ Status Change<br>☐ Completed<br>☐ Late<br>☐ To be Completed in | ☐ ◁▷ ☐<br><br><br><br>[    ] | ☐ ◁▷ ☐ |
| Finance | ☐ Changes in Budget<br>☐ Variances Posted | ☐ ◁▷ ☐ | ☐ ◁▷ ☐ |
| RFIs | ☐ Created<br>☐ Status Change<br>☐ Completed<br>☐ Late<br>☐ To be Completed in | ☐ ◁▷ ☐<br><br><br><br>[    ] | ☐ ◁▷ ☐ |
| Collab. | ☐ Created<br>☐ With Voting<br>☐ Closed<br>☐ Late<br>☐ To be Completed in | ☐ ◁▷ ☐<br><br><br><br>[    ] | ☐ ◁▷ ☐ |
| Mtgs. | ☐ When Scheduled<br>☐ Agenda Changes<br>☐ Minutes Postings<br>☐ To be held in | ☐ ◁▷ ☐<br><br><br>[    ] | ☐ ◁▷ ☐ |
| Proj Plan | ☐ Chg in Milestone<br>☐ Any Change | ☐ ◁▷ ☐ | ☐ ◁▷ ☐ |

New Members ☐     ☐ Email          Doc. Attachments:
                  ☐ On Pers. Portal     ☐ HTML
                  ☐ Both                ☐ PDF
                                        ☐ Posted Version

[ Submit ]

FIG - 5

Project Timing Plan

Milestones / Gateways

| Title | Date | Status | Symbol |
|---|---|---|---|
| | | | |

☐ Add Another 6 Fields

Timing Plan

Functional Group / Milestone / Etc.　　Owner　　Start　　Finish　　Status　　Comp %

Major Tasks

☐ Add Another 6 Fields

☐ Add Another 6 Fields

☐ Utilize Plan Above Without Attachment
☐ Utilize Plan Above With Auxiliary Attachment
☐ Utilize Only the Document Attachment
☐ Link Tasks to the Task Manager

[ Attach Document ]　　　[ Submit Plan ]

| Task Detail | |
|---|---|
| Task Name | |
| Task Description | |

| Start Date | | Finish Date | |
|---|---|---|---|
| Status | YELLOW | Completion Percentage | 25% |

| Summary | |
|---|---|
| Action Plan/ Completion Record | |

| Owner Name | |
|---|---|
| Owner Company | |
| Owner Group | |

Task Hierarchy
Main Task Title
   Sub Task Title
      Sub Sub Task Title

[Subscriptions/Notifications]     [View Related Issues/Mtgs]
[View Related Document List]     [View History of Task]
[Edit Task Information]
[Close Form]

FIG - 13

Create / Edit Task

Task Name

Task Description

Start Date | Finish Date

Status | Completion Percentage

Summary

Action Plan

Owner Name

Delegate To:

Task Hierarchy
Main Task Title
    Sub Task Title
        Sub Sub Task Title Create Sub-Task

| View Related Document List | Define Related Doc. List |
| Subscription/Notification List | Define Subscrip / Notific. List |
| View Related Issues | Define Releated Issues |
| Submit Task | Close Task |

FIG – 14

Issues Manager
- Issues List
- Issues Reports
- Issue Detail
- Closed Issues
- Archived Issues
- Create
- Edit
- Close
- Notify
- Archive
- Delete

FIG – 15

Meeting Center
- Scheduled Meetings
- Meetings in Progress
- Meeting Minutes
- Archived Minutes
- Create
- Edit
- Attend Meeting
- Leave Meeting
- Confirm Attendance
- Notify
- Archive
- Delete

| Project Health | | | | | | |
|---|---|---|---|---|---|---|
| | | | | | | Due in 1 wk |
| Overall 132 / Green | 20 - Purple | | | | | |
| | 68 - Green | | | | | 21 |
| | 24 - Yellow | | | | | 11 |
| | 20 - Red | | | | | 7 |
| Milestones / Green | M1 | G | M2 | G | M3 | Y |
| | M4 | G | M5 | G | M6 | G |
| Tasks 36 / Green | 4 - P | | | | | |
| | 20 - Green | | | | | 10 |
| | 8 - Yellow | | | | | 2 |
| | 4 - Red | | | | | 1 |
| Issues 36 / Green | 12 - Purple | | | | | |
| | 20 - Green | | | | | 5 |
| | 4 - Y | | | | | 1 |
| | 0 - Red | | | | | |
| Changes 20 / Yellow | 0 - Purple | | | | | |
| | 8 - Green | | | | | 3 |
| | 12 - Yellow | | | | | 5 |
| | 0 - Red | | | | | |
| Reviews 14 / Red | 0 - Purple | | | | | |
| | 8 - Green | | | | | 2 |
| | 0 - Yellow | | | | | |
| | 6 - Red | | | | | 4 |
| RFI 24 / Green | 4 - P | | | | | |
| | 12 - Green | | | | | 1 |
| | 4 - Y | | | | | 3 |
| | 4 - Red | | | | | 2 |
| Sort Data | Save As a Report | | | Close Form | | |

FIG – 27

| Change Manger | |
|---|---|
| | Active Requests |
| | Closed Requests |
| | Archived Requests |
| | Create |
| | Edit |
| | Approve |
| | Approve w / M-d. |
| | Reject |
| | Reactivate |
| | Notify |
| | Close |
| | Archive |
| | Delete |

NETWORK BASED, INTERACTIVE PROJECT MANAGEMENT APPARATUS AND METHOD

This application is a divisional of co-pending U.S. patent application Ser. No. 10/039,999, filed Oct. 24, 2001, Inventor Derek Gauger, entitled NETWORK BASED, INTERACTIVE PROJECT MANAGEMENT APPARATUS AND METHOD which claims the benefit of the filing date of provisional application of Ser. No. 60/242,853 filed Oct. 24, 2000 in the name of Derek K. Gauger and entitled "PROJECTMOVER", the entire contents of both applications being incorporated herein by reference.

BACKGROUND

Historically, product development involves the design of a product, engineering of the product and then manufacturing of the product, typically in large volumes. In small companies, each of these tasks is typically performed by only one or a small number of individuals who have easy access to individuals performing the other product development tasks thereby allowing each individual, regardless of his responsibilities to know or be able to obtain details of the entire design, engineering and manufacturing process.

However, such accessibility is not possible in large size corporations, particularly where individuals for a particular project or product development may be separated by hundreds or thousands of miles.

In order to address scheduling issues for project or product development involving many individuals, the project or product development steps are defined as a series of sequential and parallel tasks where each task describes the work to be done and the people assigned to the task. This type of system routes tasks to assigned individuals and allows for an indication of when each task is completed so that the next individual is notified that it is time to start the next task.

Current trends in manufacturing involving ISO-9000 and QS-9000 standards require all phases of a project or product development to be documented. This provides an opportunity to generate a database for project or product development which can be archived for access in the future when a similar project or product arises.

However, what is needed is a project monitoring apparatus and method which enables easy, interaction between authorized individuals in all phases of the project sequence, which minimizes notifications to individual about project issues, tasks, changes, etc., where such notifications are not necessary, and provides project documentation which can be archived for future reference.

SUMMARY

The present invention is a network based, interactive project management apparatus and method which facilitates the management of a project, the various manager tools of which are implemented via a computer network having electronic mail capability.

In one aspect of the invention, a software system resident in the computer network, contains a plurality of information modules, such as a document manager, task manager, finance center, project plan, issue manager, meeting center, collaboration center, request for information manager, review manager and report center which are accessible to authorized users to facilitate the interchange of information, documents, tasks, notifications so as to monitor and advance the project on a timely basis.

In one aspect, the inventive method comprises the steps of:
defining authorized individuals who have access to an interactive computer system providing data interchange;
opening a collaboration center for authorized individuals;
allowing access to the collaboration center by the authorized individual;
defining one of a collaboration purpose and deadline; and
accepting input information from authorized individuals relating to the collaboration.

In this method, all authorized individuals are allowed to perform any one of review, submit, author and change data and to interact with other authorized individuals in the collaboration center.

Further, all authorized individuals are immediately notified of a change in at least one or more elements of the collaboration center, such as the collaboration purpose, deadline, plan and input information.

The collaboration center also allows voting by authorized individuals on a collaboration element, such as the collaboration purpose and/or collaboration plan.

The inventive method, in another aspect, establishes a plurality of software based information modules to allow at least one of planning a project, establishing and tracking project tasks, establishing a collaboration center for an active interchange between individuals, reviewing project progress, tracking project finances, archiving project data, and establishing and tracking documents.

Yet another aspect, the method allows each authorized individual to establish a personal preference defining the manner and which notifications from any module in the system are received by the authorized individual. This simplifies the task of the each individual in responding to notifications which can be numerous when the individuals are working on many different projects at the same time.

The present method also utilizes a smart electronic mail notification system which allows team members to respond quickly to a requester in any notification requiring a response without going through the system log-in. process through the project portal. This smart electronic mail notification methodology, when combined with the user's ability to make document attachments to notifications, allows team members to work offline and the send responses back to the system in bulk as well as to involve other individuals not registered as team members.

The method also defines a document manager which tracks the state of documents and provides for pin pointing information that any team member may require at any point in the project.

The present invention also is an interactive computer system for monitoring the progress of a project. The computer network has operating software providing the above-defined methodology. A plurality of users or team members are interconnected to the network via various communication means, including Internet communication.

The present method and apparatus provides a unique project management tool which streamlines the monitoring and conduction of any project, allows for easy and complete notification between team members and provides archiving of all project documents and information for later retrieval.

BRIEF DESCRIPTION OF THE DRAWING

The various features, advantages and other uses of the present invention will become more apparent by referring to the following detailed description and drawing in which:

FIG. 1 is a pictorial representation of a computer network which the project management apparatus and method of the present invention on is implemented;

FIG. 2 is a screen display of the project portal in task manager mode according to the present invention;

FIG. 3 is an expanding menu for project preferences module operators;

FIG. 4 is an expanding menu for personal preferences module operators;

FIG. 5 is a screen display of the personal preferences notification form;

FIG. 6 is an expanding menu for the project plan module operators;

FIG. 8 is a screen display of a create project timing plan form;

FIG. 9 is an expanding menu for the document manager module operators;

FIG. 11 is a screen display of the create/edit document form;

FIG. 12 is a screen display of an upload multiple files form according to the present invention;

FIG. 13 is a screen display of a task detail form according to the present invention;

FIG. 14 is a screen display of a create/edit task form;

FIG. 15 is an expanding menu for the project issues module operators;

FIG. 16 is an expanding menu for the meeting center module operators;

FIG. 17 is a screen display of a meeting portal form;

FIG. 18 is a screen display of a meeting planner form;

FIG. 20 is a screen display of a create/collaboration form;

FIG. 21 is a process flow diagram of an RFI work flow process according to the present invention;

FIG. 22 is a pop-up menu of the request for information manager module operators;

FIG. 23 is a screen display of a create/edit RFI form;

FIG. 24 is menu for the project finance center module operators;

FIG. 25 is a screen display of a create budget form;

FIG. 26 is an expanding menu of the report center module operators;

FIG. 27 is a screen display of a project health report;

FIG. 39 is a screen display of the sort/filter form used with the sort view operator; and FIG. 40 is screen display of a filter search form used with the search view operator.

DETAILED DESCRIPTION

Figures 7, 10:
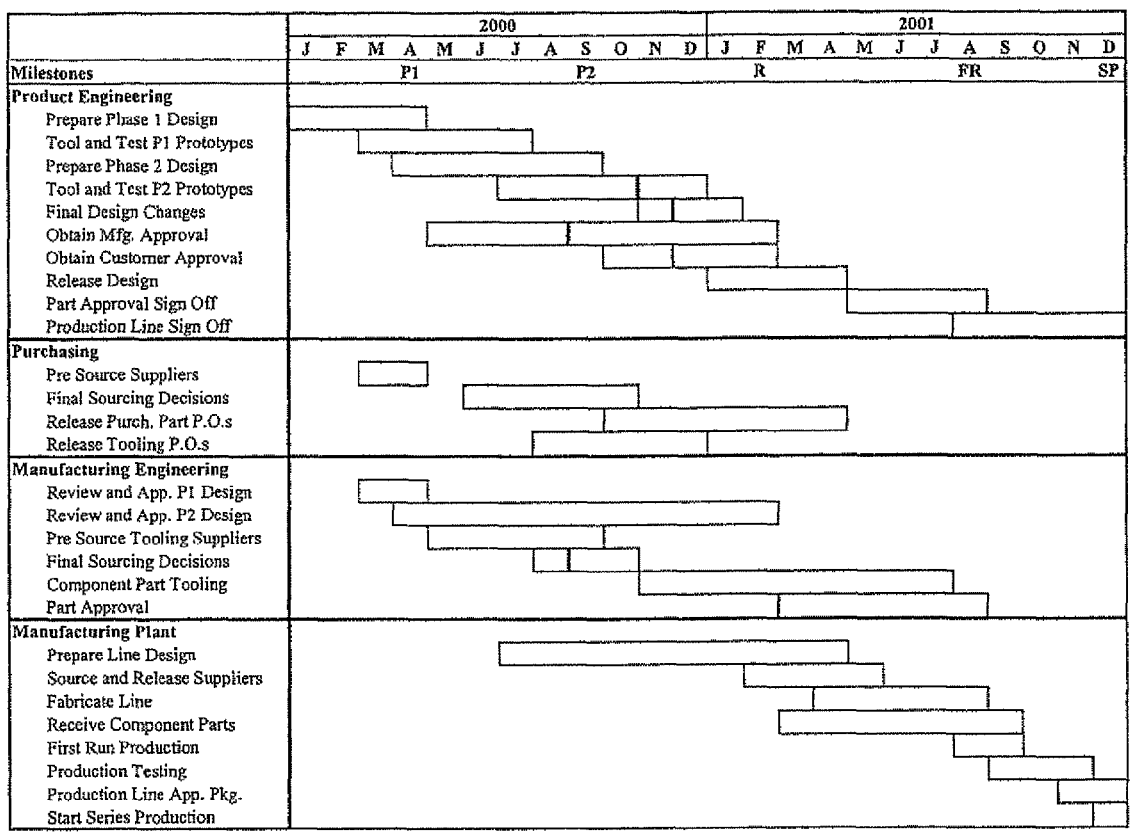
FIG. 7 is a screen display of a timing plan according to the present invention.
FIG. 10 is a screen display of the file summary menu according to the present invention.

Referring now to the drawing, and to FIG. 1 in particular, there is depicted a computer apparatus or system 10 which implements a unique project monitoring methodology. As shown in FIG. 1, a host processing unit or CPU 12 executes operating software on databases stored in a memory. The CPU 12 has a monitor 14 and a keyboard input 16. In a Internet environment, the host CPU 12 is connected by a telephone modem, direct cable line, wireless connection, etc., to an Internet service provider 18 which is capable of communicating over the Internet 20 to one or more different Internet service providers, all denoted by reference number 22 which are connected again by modem, cable connection, etc., to a plurality of nodes or individual users, 24, 26, and 28. It will be understood that the Internet service provider 22 may actually comprise multiple Internet service providers, each providing access to one or more users.

The present computer apparatus can also be embodied in an internal computer network wherein the operating software, described hereafter, and database base reside in a client server which is accessible by computer modem, cable connection, wireless communication, or combinations of these communication means to a plurality of individual users. The high level architecture of the operating system is described by an HTML interface to a database with XML data exchange for all non-ftp transactions.

Throughout the following operating system description, each browser screen will contain similar elements, such as view operators 30 which reside in a horizontal bar displayed at the top of each browser screen. View operators 30 give control to a user over view manipulation.

The view operators 30 include the following selectable commands:

Home—This button returns the display to the home page of the project selected.

Navigation—This is simply a set of "back," "forward," and "history" buttons. The back and forward are self-explanatory. The history button displays the team member's current location in a breadcrumb type style. Additionally, the user may decide to view his/her entire chronological history since logging in. This history is displayed in the same breadcrumb style with his/her current location highlighted in the pull down menu. Of course, the user may return to any previously visited area by changing the highlighted breadcrumb.

Project—This button displays the active project and allows the user to "pull down" all of the projects that he/she has access to (including their personal page).

Figures 39, 40:
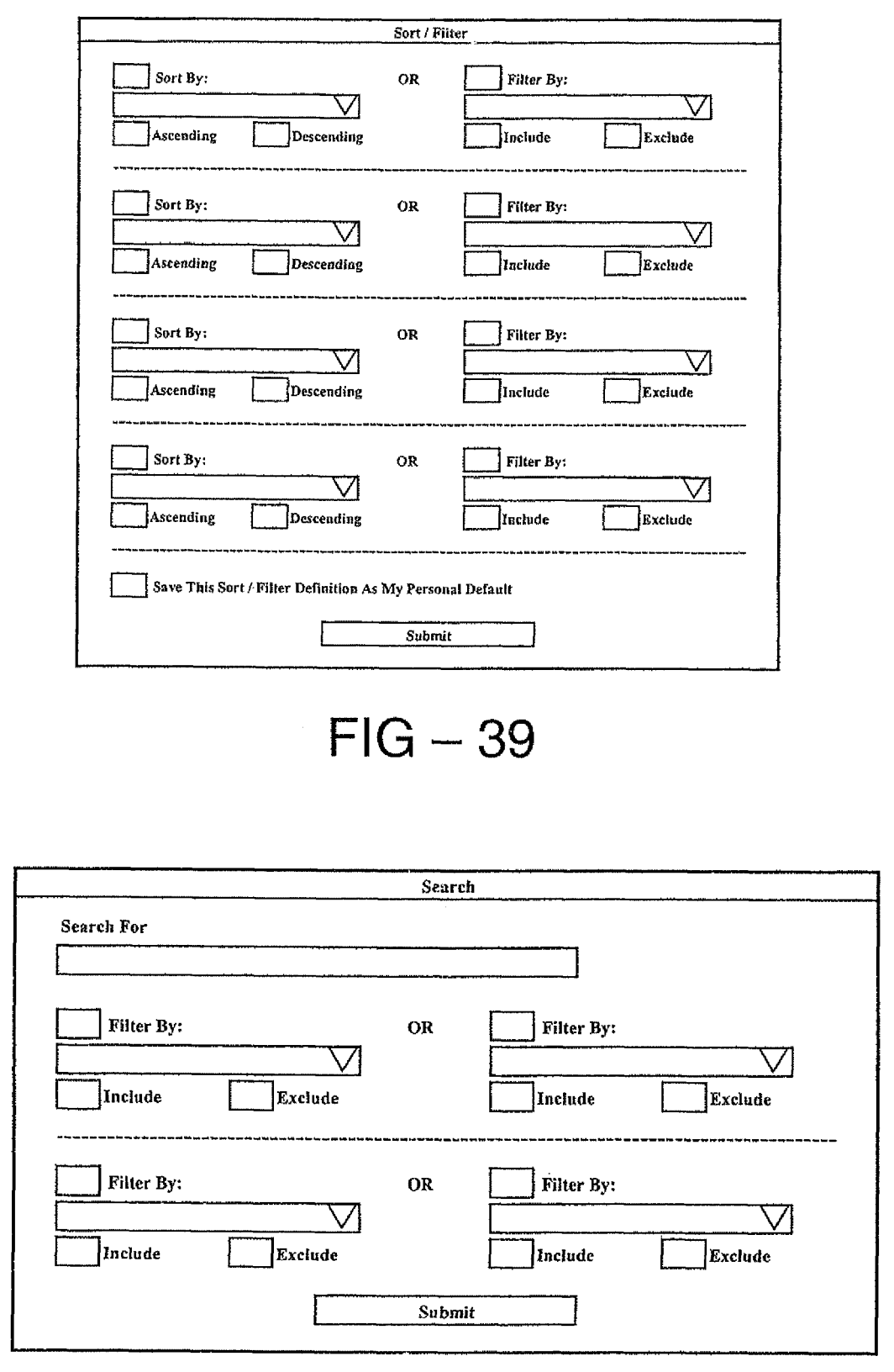

Sort—The sort button, when pushed, displays a pop-up screen (see FIG. 39) that allows team members to select the sort and filter criteria for the particular information module that is active. The sort functionality is similar for each module and only differs in that the metadata for the various Information Modules is not identical from one to another.

In general, the sort functionality allows team members to filter information, sort information, or both through a series of up to 4 metadata manipulations. Bach manipulation box has a choice of sort or filter; if sort, ascending or descending; if filter, exclude or include. Further, each manipulation box then has a pull down menu of the metadata fields corresponding to the active Information Module. Submission causes the screen to redisplay the information. Note: if a particular information record doesn't have metadata for the sort field chosen, it is automatically included in the refresh (an example of this is a sort based on company name when some individuals haven't completed that information field in their preferences).

The pull down menus for the sort function contains the metadata corresponding to the information for the active module. The pull down menus for the filter function contains the following:

Late
To be completed in the next day
To be completed in the next week
To be completed in the next month
To be completed in the next quarter
Companies
Sub Groups
Team Members Additionally, users can make quick sorts by selecting a column heading in the main screen view. The system will sort by that column; clicking it again will reverse the sort (Note: similar to sorting e-mail attribute columns in Microsoft's Outlook Express).

Team List—Depressing this button causes the system to display the team list (for the project selected) in the main screen.

Calendar—Depressing this button causes the system to display the project or personal calendar in the main screen.

Search—This button has a corresponding text window for team members to perform "simple searches" on all of the information within the project. Depressing the button without entering text will deploy the search menu as a pop up screen (see FIG. 40). This allows team members to perform "filtered searches" to reduce the number of hits displayed in the main screen.

Filter entries include those from the Sort functionality as well as each of the Information Modules.

Printable Version—This function redisplays the main screen to a version that can be printed.

Refresh—This button re-displays the current view. This is used primarily if one is expecting a change in the information.

Split Screen—This button splits the main screen vertically into two horizontal views. The top displays the list corresponding to the active selection; the bottom displays a view of the selected document. Clicking this button again returns the view to a single window. In the split screen mode, single clicking a document will invoke the system to display that document in the lower view in html format.

Time Filter—This feature is a type of sort function that filters the views by pertinence to time. It is a pull down menu with: today, this week, this month, this quarter, and all items.

Information modules 32 reside in a vertical bar to the left side of each browser screen. Information modules 32 allow a user or team member to invoke the major functional modes of the operating software, such as document management, task list, collaboration, etc. Module operators 34 are the action functions within each information module 32 and are typically unique to each particular information module 32. When a team member activates an information module 32 by clicking on its icon in the browser screen, the operating system displays the module operators vertically underneath the information module icon as shown for the "task manager" information module 32 shown in FIG. 1. The module operators 34 are vertically listed in a expanding pop-down format.

Global operators 36 reside in an upper right vertical bar of each browser screen. Global operators 36 are commonly used functions that are shared by many of the information modules. The global operators include the following commands.

Undo—This button reverses the last functional operation that the team member performed. Because this is different than "Back" which controls the view, the system will display a pop up menu describing the last functional action that will be reversed and asks for a click of confirmation.

Notify—This button invokes a pop up menu in which the user defines a distribution list (team members and other e-mail addresses), time to notify (default to immediate), and a text box. If a document or documents were selected prior to selecting, they will be attached to the e-mails by actual attachment or hot link (corresponding to the recipient's preferences).

Subscribe—This button invokes a pop up menu in which the team member may define the subscription preferences for those documents tagged prior to selection. These preferences are:

Notification Definition—(similar to Notification Form in Personal Preferences)

Choice to place document in the Personal Portal (w/browse function) Note: team members may subscribe to entire folders rather than individual files if they prefer.

Unsubscribe—This button deletes the subscription notification definitions for the document/s selected. It does not remove the document from the Personal Portal if one was placed there.

Logoff—This button disconnects the team member from the Project and Personal Portals and directs their browser to their designated website.

Bookmark—This feature is similar to Favorites in Microsoft Internet Explorer and Bookmarks in Netscape Navigator. It allows team members to save hot links to views onto their Personal Portal.

Sync—This feature is for syncing selected information to PDA devices,

Request Information—This button invokes the Request RFI form with the selected documents already attached.

Edit—This button invokes the appropriate Edit Form for the active module and/or documents selected.

Create—This button invokes the appropriate Create Form for the active module.

Notepad—This function allows team members to make personal annotations to any selected documents. These appear in the document File Summary display as a personal summary.

The system addresses basic security through a user id/password login arrangement with a timed automatic logoff provoked by lack of project interaction. Additionally, the system accepts transacts data through encryption up to 128 bit. Eventually, the system will accept person-to-person transactions with digital IDs and digital signatures.

The user interface presents all of the options available through the defined user interfaces. However, the system has a strict view, edit, and access rights system which may render some of these functions as "not available" for that particular team member. If a team member tries to perform an operation that they do not have rights to do so, the system will display an error message explaining why. To minimize errors, presented lists contain only those items that the team member has rights to view.

When team members enter names into designation boxes, the system will "complete" then automatically while the user is typing with a guess from the team list. This minimizes data entry and misspellings.

Project Preferences

Project preferences is the administration area for a particular project or personal composite portal and is selected by clicking on the Project Preference information module icon 32. Selecting the Project Preference icon will display all of the current preferences on a pull-down screen shown in FIG. 3. The preferences shown in the upper portion 40 of the preferences screen denote information segmentations or selections for various views to the main screen, with one being designated as a default. Preferences in a lower portion of the pull-down screen shown in FIG. 3 are action functions 42.

A team member's preference displays a view of all of the team members with other pertinent information in corresponding columns, such as sub-group, company, title, role, and phone number. The create/edit form, described hereafter, is used to add a team member. It has fields to capture relevant information which are displayed in a pop-up team member detail display upon double clicking upon a team member's name. Such data includes name, company, title, contact information, role (high level access), such as a project leader with full access, a group leader with author/edit access within the group and the ability to add team members, an assistant project leader with fill access without module/project delete authority, a team member with author/edit for his or her own documents, and an extended team member having view access only.

The access rights accorded each team member can vary between any of the following: view documents, create documents, edit all documents, edit group documents, add/edit team members, add/edit group team members, assign/change ownership, project deletion, view project plan, author project plan, edit project plan, archive information, workflow designation, view RFI, create RFtI, edit RFI in group, view review, create review, edit review, edit review in group, view change request, create change request, edit change requests, edit change requesting group, define project reports, edit project reports, view collaborations, create collaborations, attend meeting, schedule meetings, view project preferences, define project preferences, edit project preferences, view project news, and author project news.

The access control list is a view which displays the team member's list with their access rights displayed in columns. Double clicking on any of the team member's names will display the team member detail menu.

The project details list is a view listing the project name, project code, and identifies the key individuals who will lead the team. The key individuals may also define sub-groups and extended enterprise companies in color designations.

The policies and procedures list is a definition of the methodologies of the project and how it is managed. In the create form, the project leader labels the various color designations such as what red, yellow, and green mean specifically to the project. Additionally, the create form allows annotation to the project to help documentation for project specific direction.

The project news list is information that the project leader periodically writes to keep the team informed on project progress and milestone completion. The create form has a text field box, shown hereafter, as well as options for distribution (e-mail, on project portal, on personal portals, etc.) and the duration before the system automatically archives the notice. After the first new submittal, the system remembers the settings and automatically populates the form with these project defaults.

The define RFI owners unction, when selected, will display a pop-up form in which the project leader defines default categories for RFIs to whom the RFI should be sent for each category.

The define data structure function, when selected, displays a pop-up form that allows a project leader to define the data structure for each project document manager information module 32. The data structure is automatically populated with a folder for each information module selected in project preferences 32. This tool also allows the project leader to define access rights for the various folders.

The define information modules function allows the project leader to define and name the information modules 32 to be activated for the project through a pop-up form.

The define project portal function invokes a form to define the content for the project portal home page. Project leaders can select from any of project news, reports, key project individuals, mission statement, project plan elements, financial plan elements, announcement of new members, project calendar, attach a project file, attach a picture file, attach a graphic or logo, provide a text box, and provide project news.

The import project definition function, when selected allows the project leader to define the project by copying all of the preferences from other projects that they have access to. Selecting this function will invoke a pop-up menu with a browse a projects button as well as option for which aspects of the project to import.

The create/edit function invokes forms corresponding to each of the above-described information areas. The request change function invokes the change form for documents which are not change-controlled. Finally, the request new team member will invoke a form similar to the create team member form. This is information sent to either a group leader or the project leader via e-mail. The e-mail will contain a link to the create team member form which is contained in a holding/pending area. The project or group leader may complete the form to add the team member or delete the team member from the holding area.

Personal Preferences

The personal preferences information module 32 is the administration area for the team members. It shows only information for the team member who is currently logged in from the computer 24, 26, 28, etc. This area allows team members to configure their composite personal portals and define details for project activity notifications. The default for this information module is the list of preferences.

The module operators for the personal preferences function are shown in FIG. 4 and include a defined preferences function which invokes a pop-up form with numerous fields allowing individual information to be entered, including the team member's role, contact information, title, company, option to view detailed access rights, notifications, sort details, a default folder on the system hard drive for download purposes, the default to assign edit rights to an individual (such as an assistant) for all information owned by that individual, a web page domain name to route to after logging off, a text box to define closing for all notes and notifications, and a view preference, such as pdf, html, or launch applications.

The define notifications tool allows team members to define the notifications shown in FIG. 5 that the system will automatically send to them and how they are to receive them. Redundant notifications are avoided since the system is programmed to recognize and omit duplicate notifications. This occurs typically when a project member chooses "any document uploaded" for notification. The following options are provided: documents loaded, changed, downloaded, tasks created, status changed, completed, late or to be completed in a specific duration, issues created, status changed, completed, late or to be completed in a specific duration, change requests, review requests, finance, RFIs, collaborations, meetings, project plans, new members, and how to review notifications. Selections, as shown in FIG. 4, provided under each option to allow the team member to personalize his or her personal portal.

The personal portal is a tool for each team member to configure their personal portal. Team members may select from any or all of project news on any projects, reports on any projects, key project individuals on any projects, project plan elements, including selection from project plan items from any project, financial plan elements on any project, announce new members for any project, a calendar for personal projects, and any projects, tasks with custom sort, RFIs with custom sort, issues with custom sort, reviews with custom sort, change request with custom sort, project news, definition of a data structure, and add addition of team member selected from a list of all team members which is a composite of team member for all of the project that a particular individual has access to, or add a non-project related individual. The create/edit functions invoke forms corresponding to each of the above-listed information areas.

Project Plan

The project plan information module is an area for project managers and team members to plan the project and to view the current, past or future project plans. Project plans consist of one of the module operators shown in FIG. 6. Only those items selected in preferences will be displayed as selections for information and creation. Team members may view this information from either the project plan or the documents manager information module.

The overview module operator shown in FIG. 6 will invoke an HTML display of the current overview. If an overview does not exist and the user has authorization to create an overview, a box will ask them if they would like to create an overview.

When an overview is created, a form of categories and text boxes as well as an option to attach a document or to use a document in lieu of the form is provided. The form has categories such as objectives, deadlines, customers, suppliers, summary of specification/requirements, summary of budget, and three sections of "other" which can be renamed or omitted. Edit/delete allow those only with proper access to edit and/or delete the project plan document. The delete function will provide a prompt for confirmation. The edit function will display the create form with its current contents and buttons to delete or change the current document attachments.

The specification/requirements module operator, when opened, provides an HTML display of the current specification/requirements for the project. If such a display is not available, a create form is provided. The form may be edited or deleted with proper access.

The timing plan module operator, when opened, will invoke an HTML display of the current timing plan, shown by example in FIG. 7. If a timing plan does not exist, a prompt will be provided enabling a plan to be created by an appropriate authorized user. The creation of a project timing plan utilizes the form shown in FIG. 8 which allows an authorized user or team member to import millstones/gateways for global timing and the inclusion of major tasks within those gateways or within functional groups.

The tasks module operator will be described hereafter under the task manager information module.

The budget module operator will invoke an HTML display of the budget plan. If one does not exist, a budget plan can be created and edited or deleted in the same manner as described above.

The calendar module operator, when opened, will invoke an HTML display of the project calendar. One can be created and then edited or deleted as appropriate. The calendar display is the current month in a wall hanging calendar format. Icons in each day box represent events. Additional icons are provided for milestones, meetings, customer reviews, management reviews, vendor reviews, and team meetings. The personal calendar view for each team member will only display those events to which the team member has subscribed, has added as a personal reminder, or has added as a personal meeting. Additionally, team members may click on any calendar date to view details of that day's events. Here, team members may select singular or multiple items to subscribe to, with the operating software then placing such selected items on the user's personal calendar. Arrows are provided for scrolling forward and backward through months and a place to enter a date to view details. The create function is used to invoke the edit screen. The project calendar is created automatically as soon as milestones are entered into the Project Plan or meetings are scheduled in the meeting center. The edit/delete will provide a prompt for confirmation prior to deleting the project calendar. Edit will display a form that user's may use to add, delete or change calendar entries assuming that they have access rights to do so.

The create function displays a form with a text box for renaming and six text boxes in areas to entitle each entry. Additionally there is an option to attach a document or use document in lieu of a form.

Document Manager

The document manager information module is the core information exchange area of the present project management apparatus and method. In this module, team members may access information from any other module. The document manager information module provides team members with a tool for file organization, management, including versioning, change control, access control, subscription, etc., conversion, and viewing. All project information (except for Preferences) is accessible from the Document Manager. The Document Manager has sub-folders (automatically created by the system) for each Information Module. This gives redundancy to the ways in which team members can access data. The Document Manager treats each of the entries as if it is an HTML document. The system completes the document metadata entries automatically through defaults.

Documents and other information are identified by the document manager information module by its metadata. Various metadata tags are associated with each file, such as file title, system generated document code, author, author company, change owner(s), version, date, creation date, last modified by (name), file size, file type, subscribers, lists of reference documents, summary, primary states, and secondary states.

The primary states include: controlled, uncontrolled, change controlled, and WIP (work in progress). The controlled primary state describes files that are access and/or edit control enabled. These are files that are critical to the project, but are regularly updated by the document owner/author. Typical examples include WIP CAD drawings, meeting reports, uncompleted customer evaluations, etc.

The Uncontrolled primary state describes files with open access. These are reference files that need to be shared, but are not critical in terms of version locking. These are also files that all team members can view and/or edit regularly.

A change controlled primary state describes files with controlled access that are also designated as needing a change approval process prior to any modifications. Typical examples include supplier/vendor contracts, the project plan, released CAD files/drawings, etc.

The work in progress primary state described files that are not completed, but may benefit by the regular review by others. Documents may have controlled or change controlled versions with WIP versions submitted for secure storage and sharing.

Secondary states provide indications of the document secondary state, such as reference, approved, rejected, approved with modifications, submitted for review, acknowledged review, delegated review, submitted for change, acknowledge change, delegated change, submitted RFI, acknowledged RFI, and delegated RFI.

The secondary states are descriptors that identify the status of the files with respect to the project as well as their current progress along a workflow operation, such as a change or review request.

The module operators shown in FIG. 9 for the document manager information module include a default file structure view when the document manager module is selected. A tree-style file structure is provided with the highest level folder highlighted as a default. Team members may navigate through the tree by expanding folders into subfolders. The tree will not display individual files. The main screen displays a list of all the files for that particular project. The files are displayed with their title, author, revisions, date, file type, primary state, and secondary state. Double clicking on a particular file will launch the file summary as a pop-up form/menu as shown in FIG. 10.

In FIG. 10, the view options at the left side of the form will display a pop-up menu with pertinent information. Selecting either PDF or HTML in the view options will close the file summary form and display the document on the main screen in the selected format. Selecting launch application in the view options will download the file to the team member's system and launch the appropriate application. Downloading a file requires the user to select the type of file, a selection of where it is to be downloaded (personal composite document manager or their system hard drive), and the download button itself. File conversion converts the file to a window in a pull down menu if the available translator is appropriate for that particular file type. The encrypt button invokes file encryption for the FTP file transfer. The compress button enables file compression for the FTP file transfer.

Figure 11:
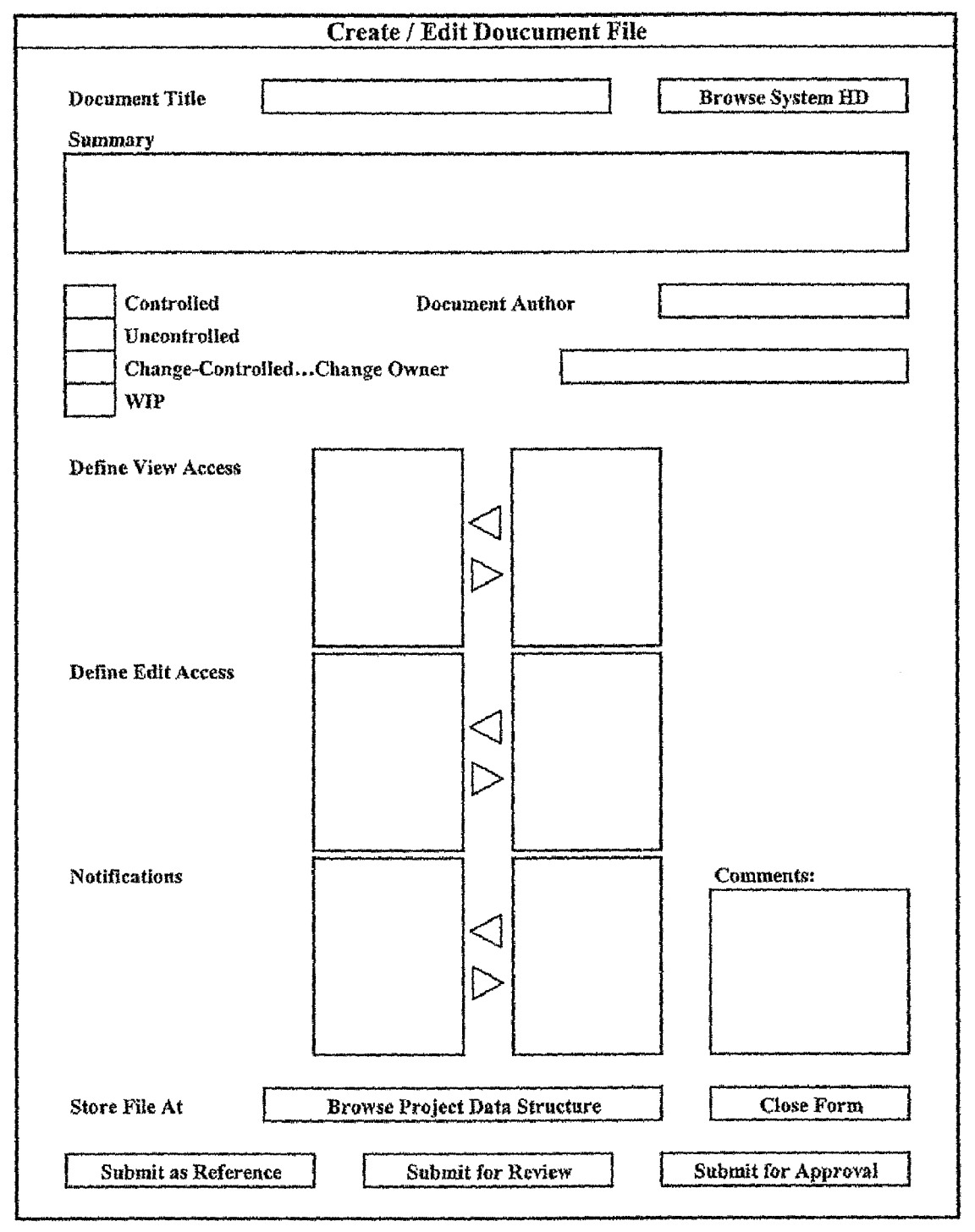

The create/edit module operator, when selected, will invoke the create/edit form shown in FIG. 11 as a pop-up menu.

If a team member leaves the document title field empty, the operating system will populate this box with the file name upon their selection of a file with the browse function. The document author field will default to the team member submitting the file. This field presents a pull down menu for the submitter to change in the event that they are submitting the document on behalf of another team member. Checking controlled will denote the document as a controlled file and will populate the view and edit access as only the submitter, author or project leader. Checking uncontrolled denotes the document as uncontrolled and will populate the view and edit access as the entire team. Checking change controlled will denote the document as change control and will populate the change owner field to the document author. This presents a pull down menu for the submitter to designate the appropriate change owner in the event that it is not the submitter. Checking WIP will denote the document as a WIP and will populate the view and edit access as the submitter, author and project leader.

Browse project data structure is populated with the folder that the create form was invoked from. Additionally, there is a pull down menu to change the folder to which the document will be submitted. Submit as reference invokes an fip process to upload the document and closes the form. Submit for review invokes an ftp process to upload the document, closes the form, and invokes the change/edit review form partially completed. Submit for approval invokes an ftp process to upload the document, closes the form, and invokes the create/edit change request form partially completed.

Figure 12:
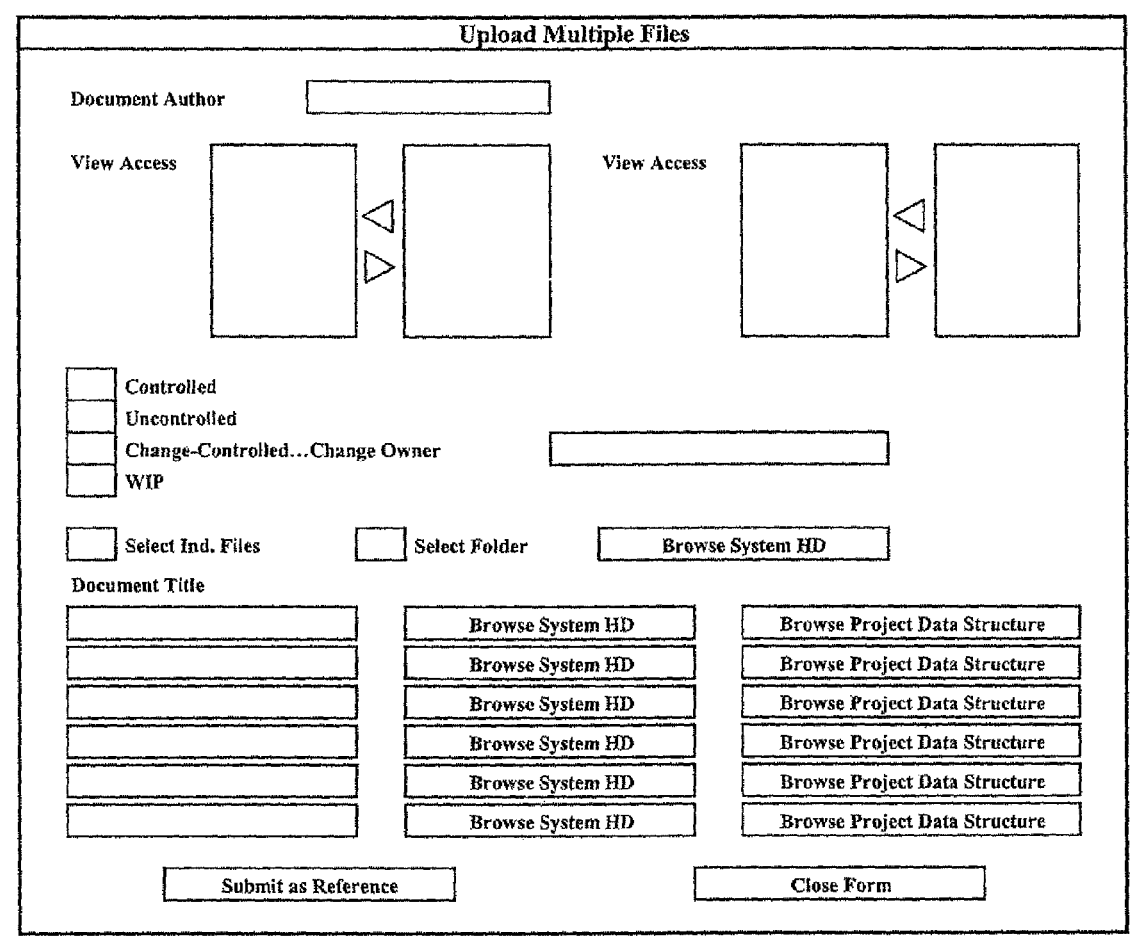

The upload multiple files module operator enables team members to quickly post multiple files to the project or personal portal. Selecting this operator invokes the upload multiple file form shown in FIG. 12.

The view module operator shown in FIG. 9 is a function which displays the file on the main screen either on in HTML or in PDF in accordance to the team member's personal preferences. The download operator function invokes a form for the team member to select the download options identical to those in the file summary form. The request change operator is a function which deploys the create change request form with the document already selected. The request review operator is a function which deploys the create review request form with the document already selected.

The delete operator allows the user, with privileges to do so, the ability to delete the document. A window will appear asking for confirmation of the delete operation. When selected, this will permanently remove the document from the project space.

The archive operator, if a user has privilege to do so, will cause a window to appear asking for confirmation of this operation. Confirmation will move the budget to the archive data structure.

Finally, the notify/remind operator is a function used to route the document via e-mail to someone and allows the addition of text.

Task Manager

The task manager information module 32 shown in FIG. 2, is the primary engine by which project progress is planned, tracked and recorded. There are three primary ways to view tasks: list form, report form, and details for an individual task. For individual or selected groups of tasks, team members may create, edit, archive, subscribe, unsubscribe, or send other team members notifications.

The task manager information module displays information in such a way that team members may use it in a visual management style. For instance, for individual and list displays, tasks carrying multiplicities of color coding, such as red to indicate that a task is either late or the progress has fallen behind schedule without a recovery plan. Yellow to indicate that a task is behind schedule or has not started on time, but there is a recovery plan in place, but not yet executed. Green to indicate that a task is on time or is not yet scheduled to begin. Purple to indicate that a task is completed. Blue to indicate that a task has been cancelled. In addition, colors can be employed to designate owners, such as orange for customers, violet for vendors, light green for project host company, and other colors for various subgroups defined in personal preferences.

Tasks in the project space on the task manager screen can be up to two levels deep. In the personal space, team members may add one additional level of detail. These tasks automatically carry that person as the owner and are displayed only in their personal view, with no other team members having view or edit access capability. Additionally, team members may create their own top-level task in the personal view with the same characteristics.

Opening the task manager information module 32 will invoke the task list screen also shown in FIG. 2. The module operators in the task list screen include a task list which will display the entire lists of tasks sorted in the order defined in the personal preferences corresponding to the active view. Task reports, when open, will display a view of the entire lists of reports defined in project or personal preferences corresponding to the active view. If this operator is opened after a sort has been performed on the tasks list, it will display a report on the sorted data.

Task Detail

When the task detail operator is selected, a list of tasks will be displayed. Double clicking on a particular task will launch the task detail form shown in FIG. 13. The form is a pop-up screen in which the header is displayed in the task status color described above. The view history button shows a chronological list in a pop-up window of changes with a list display of date, who made the change, and the post-change status color. Clicking on any item will display the detail form of the task at that date.

The task hierarchy display shows a relationship between the current task and its sub-task or parent or main task. The current task is highlighted in its status color. Double clicking on any task on this display will invoke the detail form for that task. The view subscription/notifications button will display a list version of those with active subscriptions to the task, and the task based notifications.

The edit task information button will invoke the create/edit form for that particular task. The view related documents list button will invoke a list of documents with their title, owner and state icon. Double clicking on any of these will launch the document detail form. The view related issues/meetings buttons invokes the list of issues and meetings to which that task is related. Double clicking will display a detailed record of that issue or the meeting minutes. This button is "greyed out" in the event that there is no relation to issues or meetings.

Referring back to FIG. 2, the create/edit module operator invokes a create/edit task form display shown in FIG. 14. Similar items as that described above and shown in the form depicted in FIG. 13 have the same description and function.

The create sub-task button will launch another create/edit form, with the hierarchy already completed. The define subscription notification button allows team members to make a list to which e-mails will be sent regarding this new or changed task. It will always default to notify the person to whom the task has been delegated to, those requesting it through subscription or preferences, and those previously defined when the task was originally created. The define related issues button launches a list of the current issues. Double clicking or selecting multiple issues makes a relation between the issue and the task/sub-task created to solve the issue. Close task denotes that task as completed.

The delete operator, assuming that a user has the privileges to do so, allows the authorized user to delete a task. A window will appear asking for deletion confirmation. This will erase the task and its history completely.

The archive operator, if a user has privileges to do so, will archive a task. A window will also appear asking for confirmation. This will move the task to the archive data structure in the computer database.

The notify/remind function sends an e-mail reminder notification to individuals or multiple individuals about the task with text entered by the sender in a pop-up menu.

Issue Manager

The issue manager information module is similar to the task manager in the way that the operating system manages the information. Issues are different from tasks in that issues usually precede tasks and, as such, tasks or a series of tasks are usually the outcome of the means by which the project issues are resolved, and operators shown in FIG. 15.

The rules, forms, and operators shown in FIG. 15 for the issue manager information module are identical to those for the task manager with obvious exceptions. Task hierarchy is omitted. Another state is added for tasks assigned for issue resolution. The create/edit form has a create tasks button. This invokes the create task form and changes the state to tasks assigned for issue resolution. This automatically creates a relation link between the issue and task/subtask. In conjunction with this, the form has a button to view related tasks. The view/edit form has a create collaboration button which invokes the create collaboration form and keeps a record of that collaboration in the issue details form as long as that particular collaboration remains active. The relationship or link between the collaboration, the issues, and tasks remains intact indefinitely even after they have been changed to an archived or closed state.

Meeting Center

The meeting center information module is an information area where team members can schedule, define, record, and attend meetings as well as view the resulting meeting reports. This information module automates many of the repetitive and mundane activities surrounding most meetings.

Meetings are created through the information module operators shown in FIG. 16 which generates a form shown in FIG. 17 and takes place as physical meetings, phone meetings, on-line meetings, or combinations thereof. Once created, team members may access information through the meeting center information operators shown in FIG. 16. Within these areas, team members can attend meetings and take meeting notes; both personal and group records.

On-line meetings in the present method are different from traditional on-line meetings. The present approach enhances traditional meeting methodology with controlled collaboration technologies. This is different in that there is control to the progress of the meeting and the display of the meeting presentation. In this scenario, one person controls the display of the presentation by selecting items that have already been loaded to the system server. This also expedites load time which is an inherent weakness with prior meeting systems. Team members join on-line meetings by pushing the "attend meeting" button from within the meeting portal. Once in attendance, team members may submit additional documents, such as markups for display to the entire meeting audience.

The meeting center module operators shown in FIG. 16 includes a scheduled meetings function which is a default view as users select the main meetings center selection. The display shows a list of meeting titles, with columns of the corresponding meeting number, date and chairperson. Double clicking a selection will display the meeting portal shown in FIG. 17.

The meeting and function operator, when opened, generates a view which displays the same information as the scheduled meetings operator, but only for meetings which are scheduled to begin in the next fifteen minutes or other preset time period, or are already in progress. Double clicking a selection will join a team member to the meeting and log them in as "in attendance".

The meeting minutes operator opens a view which displays the same information as the scheduled meetings and meeting in progress operators, but only for meetings that have already taken place. Double clicking on this selection will launch the meetings notes report for that meeting in an HTML format.

Figure 18:
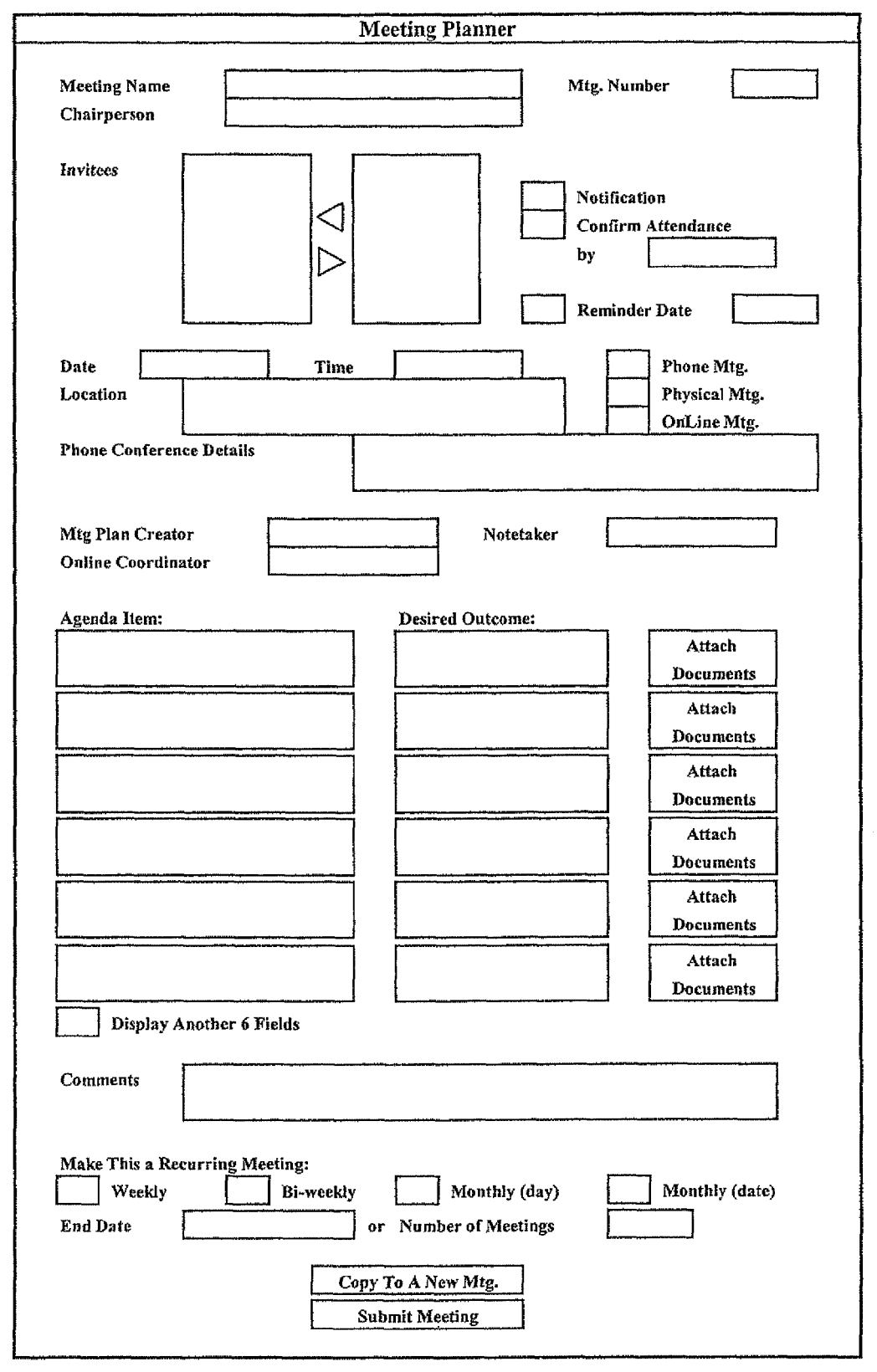

The create/edit meeting operator, when invoked, will display the meeting planner menu shown in FIG. 18 for the selected meeting. In the meeting planner form shown in FIG. 18, the meeting number is system generated. Checking notification will send a notification of that meeting to all of the invitees. This e-mail message provides a hot link to the meeting portal. The system will resend a notification if changes are made to information regarding meeting time, access, etc.

Checking the confirm attendance button will modify the notification described above in that to confirm, the team member replies to the e-mail address. The operating system automatically logs the confirmation. At the confirmation request date, the operating system sends the chairperson a list of the confirmed invitees.

Checking the invitation to non-team members will invoke the operating system to send the meeting creator an e-mail invitation. This invitation will have a hot link to the meeting portal that is active only when the meeting is about to begin or is in progress. This e-mail can be forwarded to anyone who does not have a password to access the project.

Checking the reminder date function will enable the system to send an e-mail reminder to all of the invitees. This e-mail will list changes made since the last notification, including those confirmed and not confirmed, and will provide an hot link to the meeting portal.

The attached documents button launches the multi-file uploader and gives the team member the option of browsing the hard drive or the project document manager information module.

The attend meeting button automatically joins the user to a meeting that is about to commence or is already in progress. It automatically logs the team member in as a participant. The team member's screen will display the active presentation and will provide the team member various options as a meeting participant. These options will appear as horizontal lines at the bottom of the screen and include:

1. A download/launch meeting documents for markup or annotation button which will result in a pop-up screen showing the thumbnail pictures of the original meeting documents and any others which may have been submitted for viewing during the meeting. A form which displays the standard download options will also accompany this screen.
2. A submit documents into the meeting.
3. A take minutes button which is reserved for the designated notetaker and designates a form with the agenda items with a text box for each one for a note entry.

Similarly, there is an identical feature for information requests that link to the RFI module. There are buttons for "save as draft" and "save as final". The chairperson, meeting originator, notetaker, and online meeting coordinator all have access to change these responsibilities at any time due to unavailability of a team member. This is done by selecting the meeting and editing the meeting information.

The change view button is reserved for the designated online meeting coordinator. This person controls the view of the participants screens. Depressing this button will invoke screen displaying choices for view presentation including meeting documents, recent documents submittals by meeting participants and meeting agenda.

The leave button logs a team member off of the meeting and returns the team member screen to the view prior to selecting a meeting. The confirm attendance button allows team members to confirm their attendance to those meetings requesting their confirmation. This is a redundancy to the e-mail reply system described above.

A delete button enables a user with privileges to delete the meeting plan entirely. A window will appear for confirmation of this deletion. Finally, if a user has privileges to do so, an archive window will appear allowing the user to move the meeting planned and its minutes to the archive data structure. A confirmation window will then appear.

Collaboration Center

The collaboration center information module is a place where team members hold meetings and solve team problems or issues in a time-disjoined forum. The present system does not rely on threaded discussion forms exclusively. In fact, it is only one small element of the suite of collaboration tools. This information module offers team members control over their collaboration. It also offers team members the ability to quickly decide whether it is worthwhile for them to enter into a problem solving or brainstorming session.

Figure 19:
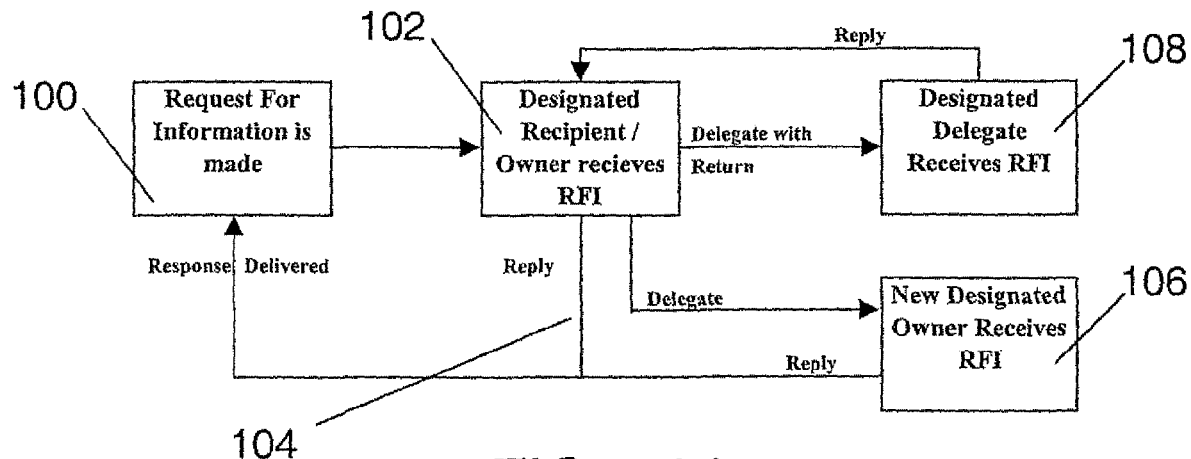
FIG. 19 an expanding menu for the collaboration center module operators.

Team members define the collaboration by completing a collaboration form by selecting one of the module operators in FIG. 19. Selecting a create operator generates the create collaboration form shown in FIG. 20. This form allows a team member to define access, define a purpose or deadline, attach documents, pose questions for a team vote, accept discussion items from members, and allow threaded discussions. During the collaboration, the discussion leader or facilitator can update the status, documents, redefine the problem/issue, etc.

The collaboration portal provides the central point of information and synopsis that team members use to quickly review status, vote on posed questions, and decide the pertinence of their participation. The collaboration portal contains all of the information contained within the create collaboration form shown in FIG. 20 organized into an HTML interface including thumbnails of attached documents, the summary, and an area for team members to cast votes.

The module operator shown in FIG. 19 includes active collaborations icon which is a default display upon a team member selection of the collaboration center. This icon displays a list of the current collaborations in progress along with columns displaying: facilitator, name, date initiated, basic status color, an indicator of whether there is a vote in progress, and the deadline for resolution. Double clicking on this selection will launch the collaboration portal.

Closed collaborations display the same information for collaborations that are closed, but not yet archived.

Figure 20:
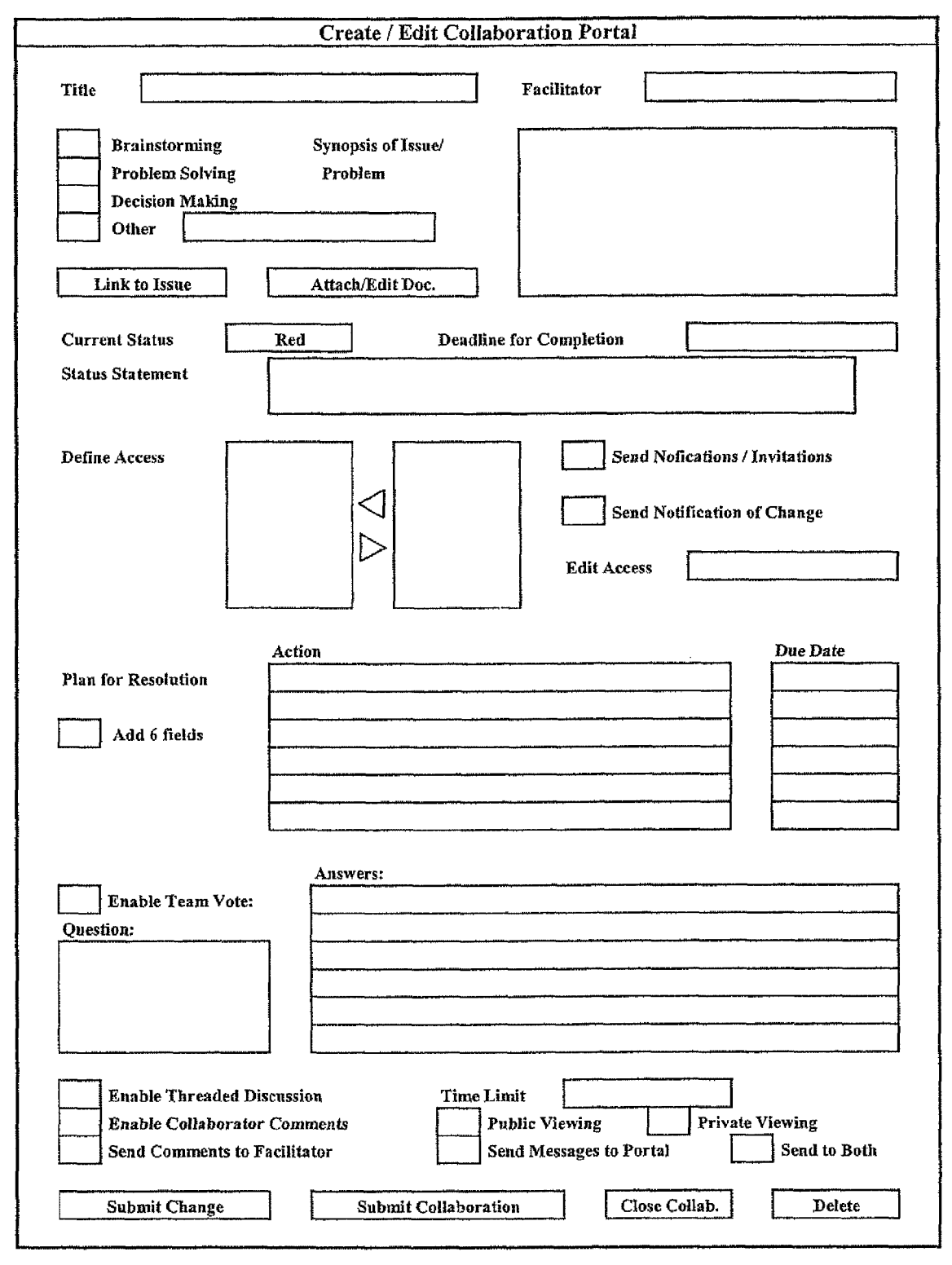

Create/edit generates the form shown in FIG. 20.

When using the collaboration form, brainstorming, problem solving, decision making, and other can all be checked simultaneously so as to help define the purpose of the collaboration. The "link to issue" button will invoke a popup screen listing all of the current issues. Selecting one will create a link between the two such that both denote each other. The status statement is a place where the facilitator enters the current status and discusses progress and next steps.

The send notifications button will send an invitation by e-mail to all the members who have defined or authorized access. If a new member is added during a change to the collaboration, this screen will cause a notification to be sent to that person at that time. Similarly, the send notification of change button will send an e-mail to all who have access with a notice of change to any part of the collaboration form or the current summary statement.

The edit access button allows an input for the facilitator to grant edit/access to another individual or team member, Enabling a team vote poses a question to team members in the collaboration portal. Collaborations with team voting enabled are denoted as such in the collaboration list. Notifications of invitation or change also state the question posed for voting in the body of the e-mail. This system will accept only one vote from each team member.

Enabling threaded discussions will provide a function within the collaboration portal for team members to view the discussion and to participate in it. The time limit input allows the facilitator to limit the threaded discussions so that it does not get unruly.

Enabling collaboration comments is the basic function of this type of collaboration. This allows team members to comment on and provide suggestions for the topic at hand.

Public viewing, when enabled, allows any invited collaborator to view any other person's comments and will automatically provide results of team voting as the votes are tallied. Private viewing, on the other hand, when enabled, only allows the facilitator to see and receive the comments and vote results. In this scenario, the facilitator updates collaborators through the status comments.

The send comments to facilitators/portals/both is a routing function in which the system either sends e-mail messages to the facilitator continually as it receives them from team members or stores them on the portal, or both.

Finally, the delete button enables the user, with privileges to do so, to delete or erase the collaboration form completely. A window will appear asking for confirmation of a delete command.

Similarly, if a user has privileges to do so, the archive button will cause the collaboration and its information to move to the archive data structure. A window will also appear asking for confirmation of the archive function.

The close button is a function which closes the collaboration, after the facilitator has made a conclusion in the status statement field, and moves it to the closed collaborations list. The reactivate function allows the collaboration facilitator or designate to reactivate any inadvertently closed collaborations.

Request for Information Manager

A request for information (RFI) is a common and everyday event that occurs in any active project. Usually this is done by telephone, fax, e-mail, or in a face-to-face conversation. These approaches are sometimes problematic as one may be requesting from the wrong team member or the information about the request is lost because it is not controlled in a central project area. Additionally, the other team members do not have the benefit of learning from the information transaction. To correct this problem, the present system enables project teams with a work flow or automated RFI system. The automation record keeping provides team members with tools to track progress, control and access information, and route the request to the person best suited to answer the question at hand.

The operating system works by sending e-mail messages to project defined recipients. These e-mail messages have the basic text request and a hotlink to the RFI for additional information, such as document attachments. The recipient can answer the request or delegate it to someone else, as it is typical of a department manager recipient who delegates it to his/her staff. During the delegation, the original recipient may elect to review the response prior to closure, receive a copy of the response, or completely delegate it which reassigns the ownership to the delegate. RFIs exist in submitted, acknowledged, delegated, and completed states.

FIG. 21 depicts a process flow diagram for the RFI workflow sequence. A request for information is made in step 100 and transmitted to the designated recipient or owner in step 102. A reply from the designated recipient in step 104 returns a delivered response to the person making the initial request in step 100.

If the designated recipient desires to delegate the RFI, the designated recipient can delegate directly to a new designated owner in step 106 without return or to a designated delegate in step 1-8 with return. In step 106, the reply from the new designed owners is sent directly to the person making the initial request in step 100. In step 108, the reply from the designated delegate is returned to the designed recipient who then in turn forwards a reply via step 104 to the original requester.

FIG. 22 depicts the module operators for the request for information manager. The active RFIs is a default display upon a team member's selection of the request for information in step 100. This is a list of current RFI in progress along with columns displaying name, requester, recipient, designated recipient, date initiated, due date (this will show green, yellow-due within one week, and red-late, and its state). Double clicking on a selection will launch the RFI screen where one can view all of the detail information concerning the workflow history with time stamps for each individual's activity.

Closed RFIs display the same information as active RFIs except that they cover RFIs which are closed, but not yet archived.

Figures 23, 25:
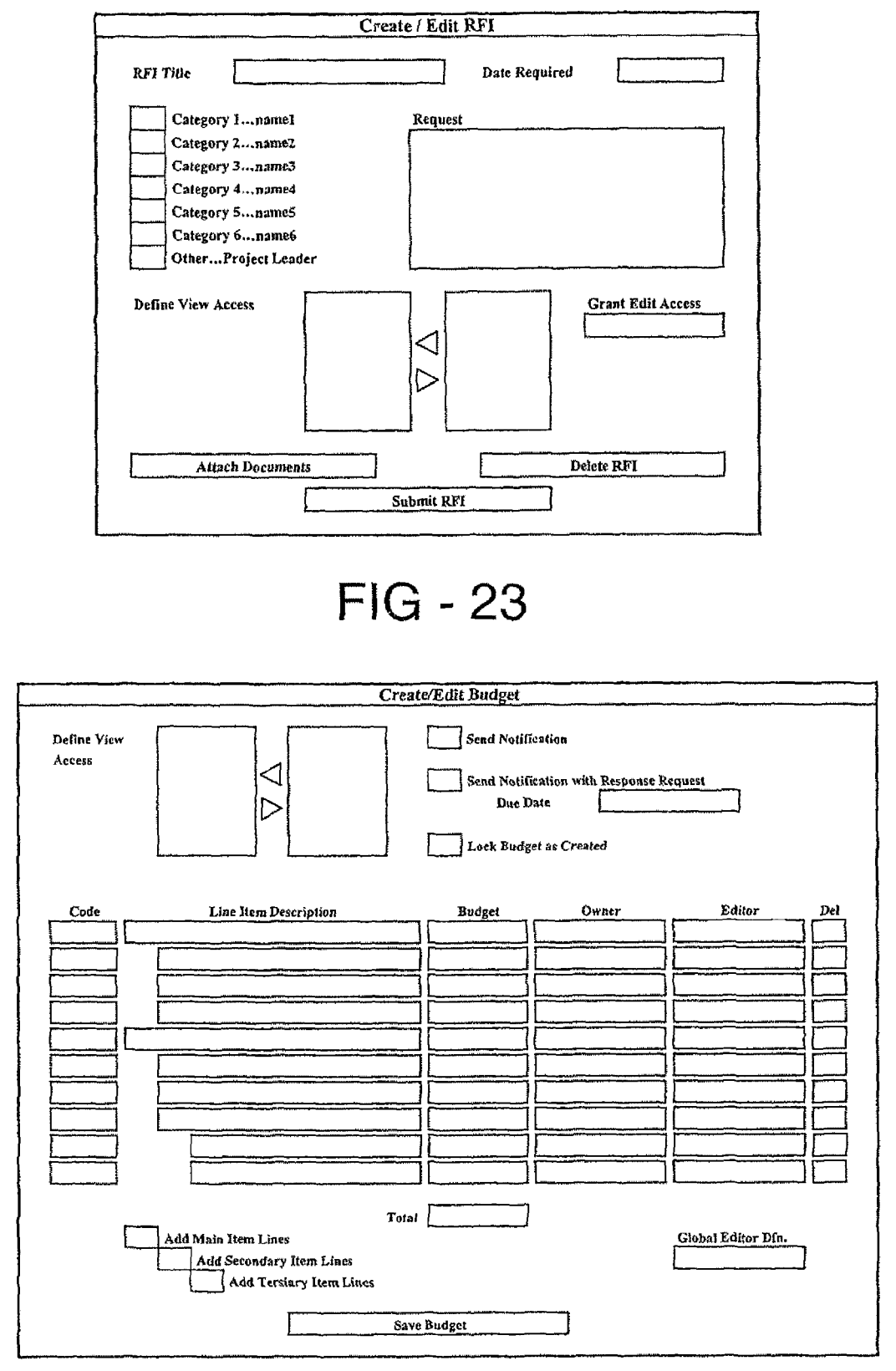

Selecting the create/edit operator will invoke the create RFI form shown in FIG. 23 as a pop-up menu. The category listings prompt the requester to select one of the already pre-defined categories in project preferences. It will list the actual category and the actual defined name. Attached documents presents a multi-file uploader that can browse the project Document Manager module as well as the team member's hard drive. The delete RFI function completely removes the RFI from the system and sends notification to all others involved (recipients and delegated recipients) that the request is no longer active. The respond function button enables the recipient team members to respond to RFIs. It allows them to enter text and attach documents. Submitting a response changes the state to "closed" and prompts the system to send an e-mail notification to the requester with a text response and a hotlink to the closed RFI detail.

The reactive function enables original requesters to reactive a closed RFI. Selecting this function will invoke the create/edit menu so that the requester can revise the request. This function is used during situations where the response is not adequate or addressed the issue incorrectly. The original response stays with the revised and re-activated RFI.

The archive function enables the user with privileges to move the RFI to the archive data structure. A window will appear asking for confirmation of the archive function.

The notify/remind function is used to route the RFT via e-mail to another party and allows for the addition of text. Team members may use this to remind the recipient about the RFI or request help with the RFI without delegating it away.

Finance Center

The project finance center information module is a place to prepare project budgets, track the budgets, and automatically prepare financial reports. Team leaders or the designated financial leader may use this feature for any budget from a high level picture of the budget or a project with minute levels of detail (up to three levels are possible) and anything in between. In small projects, typically the team leader or his/her assistant will interact with this information module. In larger organizations/projects, the accounting department or project accounting personnel will provide input based on numbers from the corporate accounting system. This interface may be automatic.

As shown in FIG. 24, the summary view module operator is a default view when the finance center information module is selected. This shows the composite budget and all of the main or first level categories row-by-row with various columns including code, item description, budget amount, forecast, actual cost, and item owner.

The detail view operator shows the same information as summary view, but with the addition of the next two levels of financial line items (sub-codes). Double clicking any of the entries in this view or any other view will launch the edit form.

The variances operator lists only those entries in which there is a variance to budget (actual or forecast). If the line item is a first or second level entry with subsequent levels, the operating software will also display the subsequent levels. The columns will display various information including code, item description, budget amount, forecast, actual cost, % over/under, amount over/under, item owner, and a button to view variance explanations. This button will be red with an annotation of "no variance explanations" is there is not a posted explanation.

The create function will invoke the create budget pop-up menu shown in FIG. 25. In this menu, the view access command allows all team member listed as owners or editors, to have access to the financial center. The send notification command sends a simple e-mail to all team members who have view access. The send notification with response request command will send a simple notification to those with view access who are not owners. To owners, the system will send an e-mail with budget items described in a note to respond by an indicated date.

The total function is the running total of the budget as amounts are populated. Project leaders can use this as a budget calculator.

The global editor definition function allows the user to define an editor who has access has to input data for each line item. This may be the company controller or a team member from the accounting department.

In the edit operator, the budget is considered a "change-controlled" document as soon as it is locked. However, the budget receives regular edits from team members as they enter forecast updates and actual expenditures. The aspect that is under change control is the budgeted amounts. For this reason, team members may edit budget lines items by double clicking on each line item or highlighting/marking them and selecting edit/update or the global edit function. Of course, team members may also select multiple items and the system will generate a pop-up menu with only those line items that they are either the owner or have edit access to. The project leader always has edit access.

This menu allows team members to input forecast and actual amounts as well as to provide variance explanations.

The request change operator is similar to the change request center in that the budget is a change/controlled document in which many team members may need to regularly request changes due to the dynamic nature of project finances.

The reports operator invokes a report interface only for the financially reporting tools.

The delete and archive functions are similar to that described above in other operator screens.

Report Center

The report center information module is an informational area to view the health of the project progress as well as a tool to define custom reports. These custom reports are deposited in the report center and Document Manager and can be posted in other areas such as the project home page. The Report Center has four primary report repositories: project heath, project reports, project activity, and closed reports. These are presented as module operators in the pop-up menu shown in FIG. 26. When the project health operator is selected, a single system generated report shown in FIG. 27, by example only, is generated that is all inclusive of the system reporting functions. This is a generic report that allows team members to perform sort operators to manipulate the data. At any point, the team member may use the notify function to send an e-mail in HTML version, of their created manipulation with a notation. This freezes the information at the time the notice is sent. Additionally, the team members use the "save as report" function to invoke the create/edit report form shown in FIG. 28 which is partially completed by the team member's manipulations.

The report includes colored areas, such a purple, green, yellow, and red bars which scale automatically to fit the horizontal space. The scale for individual items is the same from item to item. If the team member selects the sort function, the operating system launches the form for reports. Additionally, the display of the information denotes that filters that have been applied at the top of the report.

Figure 28:
FIG. 28 is a screen display of a create/edit report form.

In the create/edit report form shown in FIG. 28, the date field is populated automatically by the operating system. The notification function sends the report in HTML format over e-mail to the access list along with a hot link. Freeze information holds the report static as the actual project data changes. Dynamic information updates the project data continuously.

The select module function is a pull down menu of overall project, tasks, issues, changes, reviews, and RFIs. The Due In function allows the report creator to include the number of tasks, issues, etc., that are due within a specified time period. In the report, this is listed for each status category in the same manner as in the project health report.

The sort function invokes the sort form so that the report creator can restrict the data considered for each report module or globally through sort filters. The preview function allows the report creator to preview sections of the complete report before saving the report. The display is in HTML in a pop-up window. The delete function allows the user to start from scratch in the event that after previewing the report, the module does not make sense for reporting. The close report function changes the report state to closed and moves it to the closed report section. All data summarized in the report is frozen regardless of whether the report had dynamic information enabled or not.

The project report operator is a default view upon opening the report center. This contains all of the saved reports for that project along with report title, creator, and date.

The project activity operator is a section that shows the activity within the project portal space in a given period of time. This is depicted in a display shown in FIG. 29 which is provided with team member selections.

The view details button displays a list of each activity in that category descriptively and in chronological order. Double clicking anything on this list will invoke the system to display the details of that particular transaction. By example, double clicking on any particular task change reported will cause the display to change to the task detail for that particular task.

Review Center

The review center information module is a place in the project space where team members can request other team members to review material, documents, ideas, etc. Here, team members can also view current (active) and closed review requests. The process is very similar to the RFI process except that in this process, the requesting team member defines the individuals to whom the request is sent. Additionally, the review requests can be routed to multiple recipients in either a parallel or serial process.

Figures 29, 30, 32:
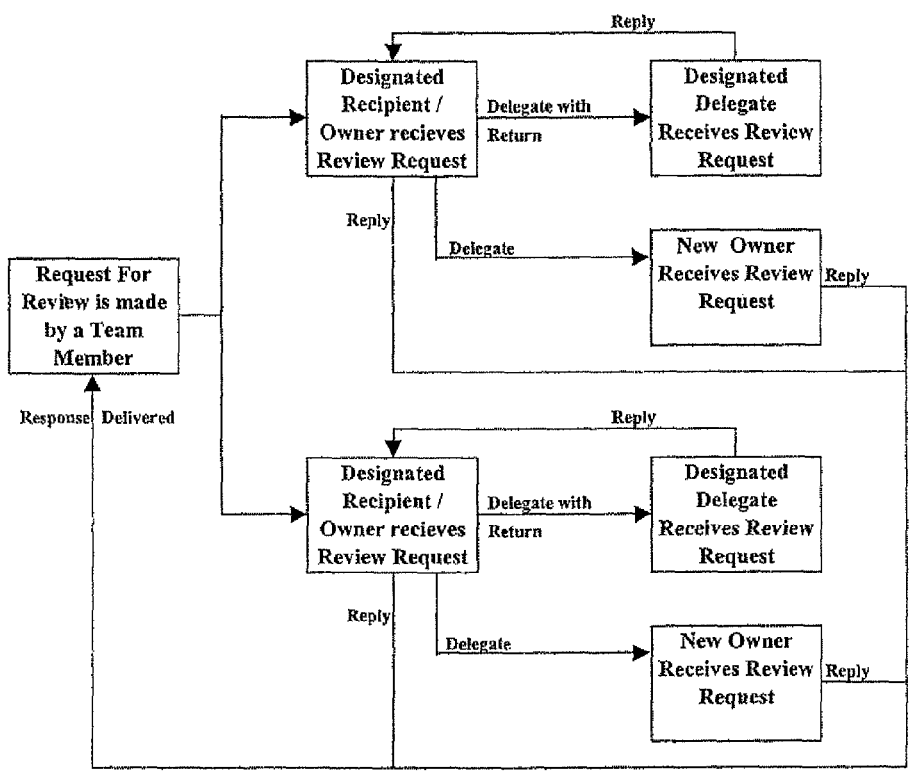
FIG. 29 is a screen display of a project activity form.
FIG. 30 is a process flow diagram of a parallel review process according to the present invention.
FIG. 32 is an expanding menu of the review center module operators.

The system works as shown in FIG. 30 by sending e-mail messages to the form defined recipients. These e-mail messages have the basic text request and a hot link to the Review for additional information, such as document attachments. The recipient can answer the request or delegate it to someone else. During the delegation, the original recipient may elect to review the response prior to closure, receive a copy of the response, or completely delegate it which reassigns ownership to the delegate. Review requests exist in submitted, acknowledged, delegated, and completed states.

Figures 31, 33:
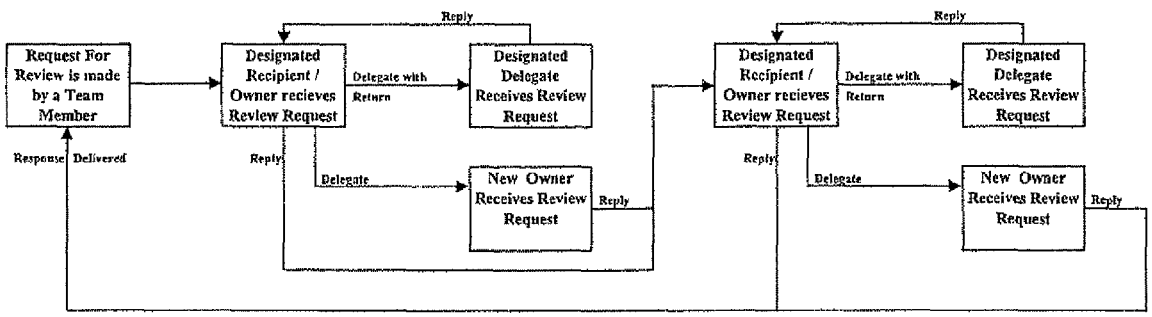
FIG. 31 is a process flow diagram of a serial review process according to the present invention.
FIG. 33 is a screen display of create/edit review request form.

FIG. 31 depicts a workflow for a serial review process. This is similar to that described above and shown in FIG. 30 for a parallel review process.

The module operators shown in FIG. 32 include Active Reviews which is a default display upon selection of the review center. This function displays a list of the current reviews in progress along with columns displaying name, requester, recipient, delegated recipient, date initiated, date due (this will show green, yellow—due within a week, and red for late), and its state. Double clicking on a selection will launch a review screen where one can view all of the detail information including the workflow history with time stamps for each individual's activity. The close reviews function displays the same information as active reviews except that the reviews are closed, but not yet archived.

Selecting the create/edit operator will invoke the Create Review Request form as a pop-up menu shown in FIG. 33. Team members must select either a parallel or serial routing method. The view access field is automatically populated by the operating system with the recipient names. Attach documents presents a multi-file uploader that can browse the project Document Manager as well as the team member's hard drive. Delete review request completely removes the request from the system and sends notification to all others that the request is no longer active.

The respond operator enables recipient team members to respond to Reviews. This allows them to enter text and attach documents. Sending a response changes this date to "closed" and prompts the system to send an e-mail notification to the requester with a text response and a hot link to the closed Review Detail. Reactivate simply reactivates a closed review. Archive is similar to archive functions described above. The notify/remind operator is a function used to route the review via an e-mail to someone and allows for the addition of text. Team members may use this to remind the recipient about the review or to request help with the review without delegating it away.

Change Manager

This information module automates the various change processes that occur in project teams while giving document owners and/or project leaders control, accessibility, and team member accountability over critical and change-sensitive information. There are two distinctly different change request/change management processes which relate to two different types of information. More importantly, change requests to "change controlled" documents (documents that are owned by the project) follow a regimented and automated work flow approval process. These are documents/files that have been denoted as such due to their change-sensitive nature. All such documents have a defined approval routing which is done either when the document is submitted as change-controlled or when a project leader denotes it as such.

Figure 34:
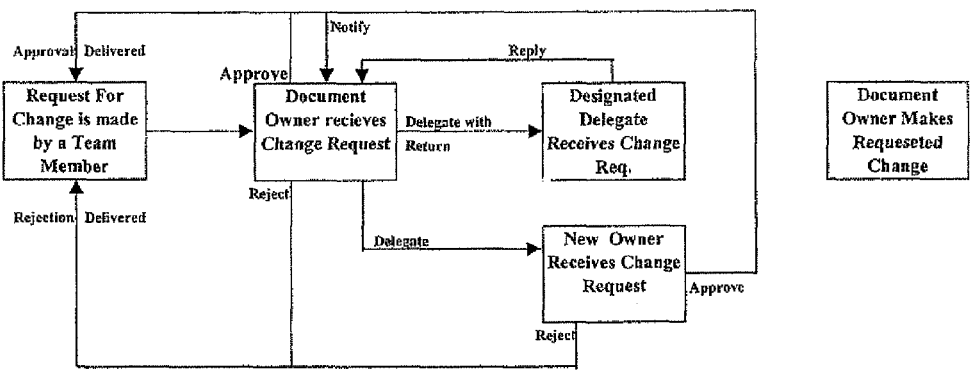
FIG. 34 is a process flow diagram of the workflow for change requests of documents that are not change-controlled.

Alternately, documents that are not change-controlled follow a less strict process. For these less sensitive files the change process is similar to a simple request that is routed to the document/file owner. The following flow diagram shown in FIG. 34 is for a non-change controlled documents. For these documents, the operating system does not change the document's state during the process and treats it as simple automated request. The actual changing of the document is the responsibility of the document owner and takes place outside of the automated process. If the request was delegated, the system sends an approval notification to the document owner.

Figure 35:
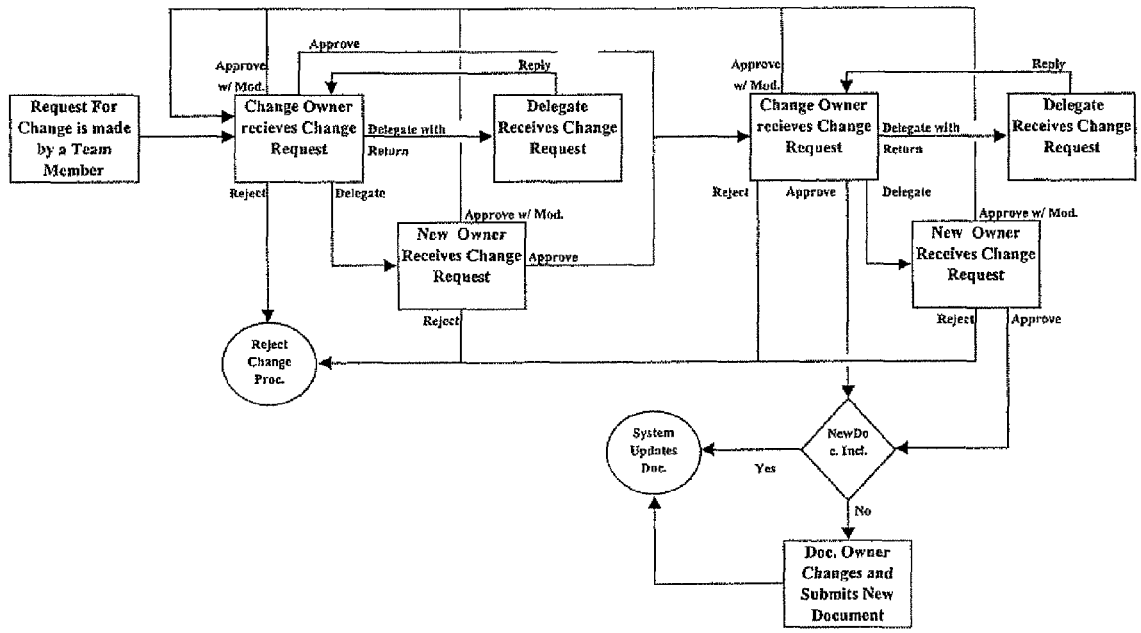
FIG. 35 is a process flow diagram of the workflow for change requests of change-controlled documents using a serial process.
Figure 36:
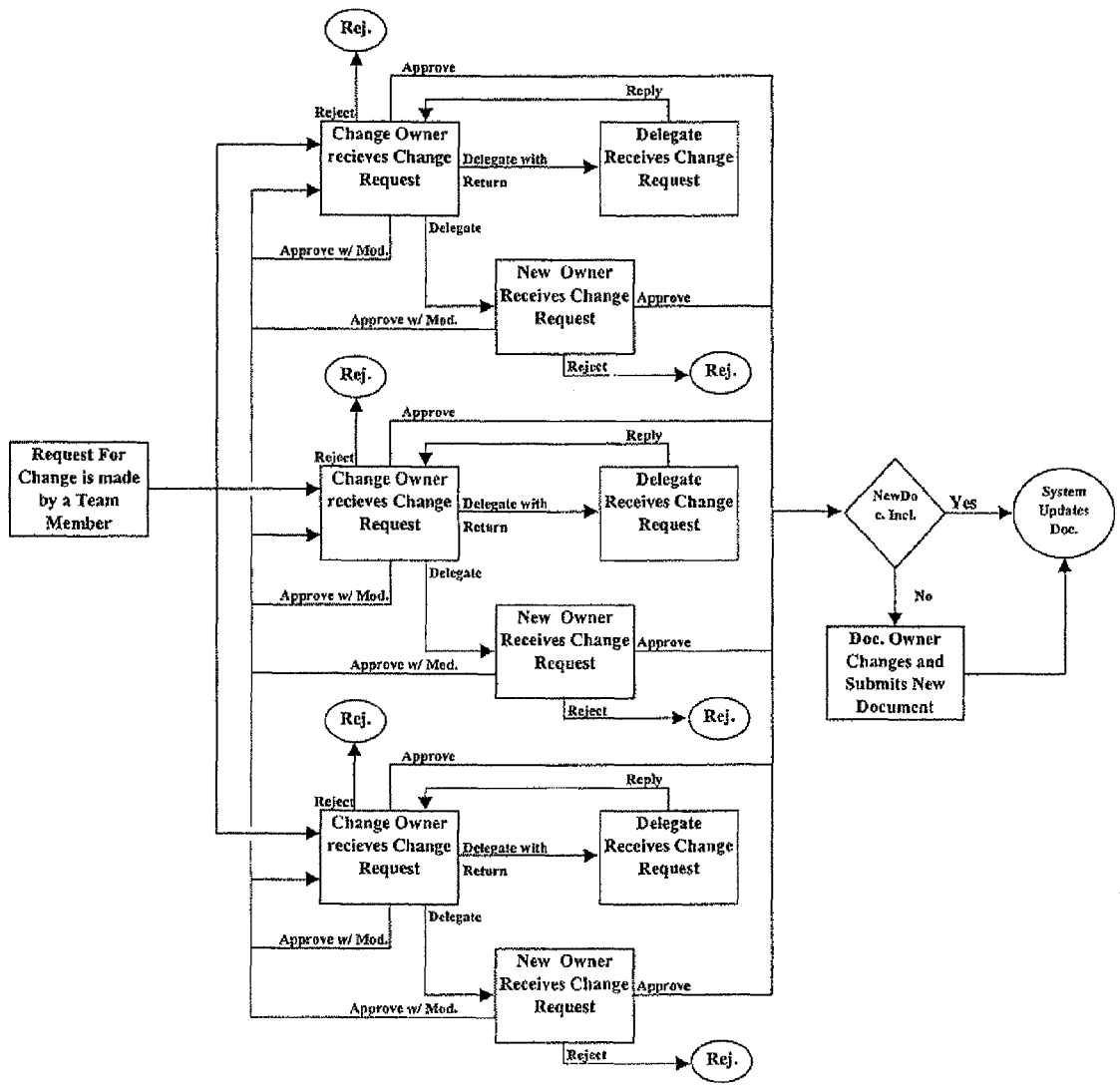
FIG. 36 is a process flow diagram of the workflow for change requests of change-controlled documents using a parallel process.

For documents that are change-controlled, the process and actual document change are completely automatic. This can be in a serial process shown in FIG. 35 or in a parallel process shown in FIG. 36.

When a change is requested, the document being submitted for approval is locked for changes. The operating system changes its state to "submitted for approval" and the existing approval document to "approved-change requested". If the result of the workflow is positive, the state of the submitted document changes to approved and its version is incremented and the existing approved document changes to "archive".

If the result of the workflow is negative, the originally approved document returns to "approved" and the submitted document changes to WIP Rejected. In a positive outcome, the document is automatically updated in the Document Manager module if the change request contains an attachment of the proposed change. If there was not an attachment of the proposed change, the system routes a request to the document owner to make the approved changes and to submit it though the Change Manager module.

At any point in the process, approvers may make modifications to the requested change. Each time this is done, the modified request is rerouted to those approvers prior to that in the process for their subsequent reapproval. Although the process flow diagram shown in FIGS. 35 and 36, suggest the team member who made the modification and "approval of modification" will receive the document for a reapproval of his/her own modifications, the operating system skips that particular person. Additionally, if an approver has requested a complete delegation, the modified change request skips the original approver and goes directly to the delegated approver.

Change requests exist in submitted, acknowledged, delegated, approved, approved with modifications, and rejected states.

Figures 37, 38:
FIG. 37 is an expanding menu of the change manager module operators.
FIG. 38 is a screen display of a create/edit change request form.

The module operators shown in FIG. 37 for the change manger module include an active change request function with is a default display upon selection of Change Manager. This function displays the lists of the current change request and progress along with column displaying name, requester, recipient, delegated recipient, date initiated, date due (shown in green, yellow when due within one week, and red for late), and its state. Double clicking on a selection will launch the Change Request screen where one can view all of the detailed information including the workflow history with time stamps with each individual's activity. Here approvers can comment on each field.

The close change request operator displays the same information as change request, but for requests that are closed, but not yet archived. Selecting the create/edit functions will invoke the change request form shown in FIG. 38. In this form, the change number field is automatically populated with an unambiguous number. The attached data request button launches a browse function for both the team member's hard drive and the data structure in the Document Manager. The attached reference document function allows the team member to attach a document that might clarify the change request. Depressing this button activates the same browse function described above.

The edit access function allows the requester to give change request edit rights to another project team member. The view access window is automatically populated by the system with the designated document approvers.

Referring back to FIG. 37, the delete and archive operators are similar to those described above. The approve operator allows the recipient team members to approve the Change Request. When all designated reviewers approve the request, the system sends e-mail notifications to all parties involved, changes the state to approved, and automatically updates the document in the Document Manager. The approve with modifications function accomplishes the same items as the approved function, but prompts the approver to submit the modifications through a text box and/or a document attachment which represents the new or modified document under review. Prior to approving this modification, this system sends the modified request back to the other approvers for their concurrence.

The reject operator is used when any one of the approvers rejects the request. The system changes the state to rejected and sends notifications to all involved parties. If the document attached for review is a stored WIP document in the Document Manager, the system changes the document state to WIP Rejected.

The reactive function allows original requesters to reactivate a closed request. Finally, the notify/remind function is used to route the Change Request via an e-mail to someone else and allows the addition of text. Team members may use this function to remind the recipient about the pending change or to request help with the request without delegating it.

Notification e-mails that inform team members about something that requires a response, contain a number of respond to e-mail addresses and subject line content. This system allows team members to respond quickly without going through the login process. This also, when combined with user's ability to request document attachments to their notifications, allows team members to "work offline" and send responses back in bulk as well as to involve other individuals not registered as team members. Project Preferences will give the Project Leader the option of enabling smart e-mail notifications for those events that require document attachments for security control. It will also give the option of enabling smart e-mail notifications with a secure e-mail transaction system. Some examples of this are: change request approval or rejection, review request response, RFI response, meeting attendance confirmation, unsubscribe to this document, acknowledge RFI, acknowledge change request, acknowledge review request, attend meeting, and voting.

What is claimed is:

1. An interactive method for managing at least one project on an interactive computer system providing electronic data interchange for the at least one project the method comprising the steps of:

creating, using one or more computers, a collaborative project portal including one of importing from a previous project portal or defining in a new project portal:
project preferences including one or more of project policies and procedures, team members, team member personal preferences including information ownership, information rights and a notifications definition;
project planning preferences including one or more objectives, deadlines, finance and task definitions;
document management preferences including one or more importing or creating controlled and uncontrolled project files, review request, review status and review completion parameters; and at least one of:
collaboration center definition including defining at least one collaboration in the collaboration center associated with the at least one project to facilitate resolution of at least one of a project issue and a project problem, the collaboration containing and allowing access to all information relating to the collaboration as a central point of collaboration information; the at least one collaboration including a collaboration leader, a collaboration topic, a collaboration status and at least one of a text based collaboration summary, and a text based collaboration status statement;
request for information definition including routing, delegation and archiving parameters defining issuing a request for information, forwarding the request for information to at least one designated request recipient in each of a plurality of organizational categories, and providing the designated request recipient with the capability of one of replying directly to a requestor of the request for information, delegating the request for information to a designated delegate recipient with the capability for the designated delegate recipient to respond directly to a requestor of the request for information, and delegating the request for information to a designated delegate and reviewing the response from the designated delegate recipient prior to delivering the response to the requestor;
linking, by the one or more computers, a plurality of information items creating bi-directional data navigation between the two at least information items, and providing, by the one or more computer, access to an authorized individual to directly navigate one of the plurality of linked information items in another information module without manually opening the information module related to the linked information item and search in the information module for the linked information item; and
issuing, by an authorized project individual using the one or more computers, a request for project review including designating a plurality of designated recipients of the review request by an authorized individual, providing for a reply from the plurality of designated review requests by one in parallel from each designated review recipient and in series from all of the designated delegated recipients, providing for the delivery of the review request to the designated recipients in one of directly in parallel providing each of the designated recipients with the capability of one of replying to the review request directly, delegating the review request to a designated delegate with the capability for the designated delegate to respond directly to a requestor of the request for review, and delegating the request for review to a designated recipient with the designated recipient's response routed to the designated recipient for review prior to delivery to the requestor, and to a designated first recipient directly, providing the first designated recipient of one of replying to the review request for direct delivery, delegating the request for review to a designated delegate with the capability for the designated delegate to respond directly to a requestor of the request for review delegating the request for review to a designated recipient with the designated recipient's response routed to the first designated recipient for review prior to the requestor, and serially delegating the review request to a next designated recipient having the same reply and delegating options to deliver a reply to requestor.

2. The method of claim 1 further comprising the steps of:

using bi-directional electronic mail interaction between authorized individuals and any of the project references, project planning preferences, document management preferences, collaboration center definition and request for information definition; and each project preferences, project planning preferences, document management preferences, collaboration center definition and request for information definition initiating, generating and sending an electronic mail request to an authorized individual;

the authorized individual replying to the collaboration project portal by electronic mail; and the project references, project planning preferences, document management preferences, collaboration center definition and request for information definition automatically documenting the reply and any documents attached to the reply by updating the information in the appropriate project references, project planning preferences, document management preferences, collaboration center definition and request for information definition.

3. The method of claim 1 further comprising the step of:

providing an electronic notepad for each authorized individual to make personal notes about any item of information in the network relating to the project; and attaching the personal notes to the items of information for use only by the authorized individual.

4. The method of claim 1 wherein the request for information definition comprises:

the project leader specifying the name of at least one authorized individual as a request recipient for each defined organizational category for defining individuals to whom project requests for information related to that organizational category will be routed.

5. The method of claim 2 further comprising the step of:

providing an electronic mail response capability for at least certain of the requests and notifications in any of the project preferences, project planning preferences, document management preferences, collaboration center definition and request for information definition allowing an authorized user to respond to a request and notification by direct electronic mail reply.

6. The method of claim 1 wherein the collaboration center definition further comprises the step of:

allowing all authorized individuals to perform at least one of review, submit, author, and change data and to interact with other authorized individuals electronically in the collaboration center.

7. The method of claim 1 wherein the collaboration center definition further comprises the step of:

notifying all authorized individuals of a change in at least one of the collaboration purpose, the deadline, the collaboration action plan, and input information.

8. The method of claim 1 wherein the collaboration center definition further comprises the steps of:

forwarding one of a question and an issue involving at least one element of the collaboration to be decided by all collaboration approved individuals;

accepting votes of collaboration approved individuals for the issue on at least one element of the collaboration;

making a decision by the collaboration leader on the issue based in part on the votes; and displaying the results of the vote.

9. The method of claim 1 wherein the collaboration center definition further comprises the step of:

maintaining and displaying at least one of the collaboration summary, the collaboration status, and the collaboration status statement of each collaboration.

10. The method of claim 1 wherein the collaboration center definition further comprises the steps of:

providing the collaboration center with the capability of receiving documents attached to authorized individual responses.

11. The method of claim 1 wherein the request for information definition further comprises the step of:

specifying the name of at least one authorized individual as the request recipient for each defined organization category.

12. The method of claim 1 further comprising the steps of:
providing a project plan having a plurality of items;
linking each item to a set of tasks;
linking any item and any task to an issue describing a problem and a call for action; and
linking all of the information and actions associated with the issue to the tasks and the project plan item.

13. The method of claim 12 further comprising the step of:
linking all of the information and actions associated with the issue to the collaboration center definition.

\* \* \* \* \*